United States Patent
Ohishi et al.

(10) Patent No.: US 7,777,865 B2
(45) Date of Patent: Aug. 17, 2010

(54) TIME DIFFERENCE MEASURING DEVICE, MEASURING METHOD, DISTANCE MEASURING DEVICE, AND DISTANCE MEASURING METHOD

(75) Inventors: Masahiro Ohishi, Itabashi-ku (JP); Fumio Ohtomo, Itabashi-ku (JP)

(73) Assignee: Kabushiki Kaisha TOPCON, Tokyo (JP)

(*) Notice: Subject to any disclaimer, the term of this patent is extended or adjusted under 35 U.S.C. 154(b) by 500 days.

(21) Appl. No.: 11/664,666

(22) PCT Filed: Sep. 30, 2005

(86) PCT No.: PCT/JP2005/018142
§ 371 (c)(1),
(2), (4) Date: Apr. 4, 2007

(87) PCT Pub. No.: WO2006/038559
PCT Pub. Date: Apr. 13, 2006

(65) Prior Publication Data
US 2009/0122296 A1 May 14, 2009

(30) Foreign Application Priority Data
Oct. 4, 2004 (JP) .............................. 2004-291495
Jun. 9, 2005 (JP) .............................. 2005-169500

(51) Int. Cl.
*G01C 3/08* (2006.01)
(52) U.S. Cl. ...................... 356/5.1; 356/5.01
(58) Field of Classification Search ........ 356/5.01–5.15
See application file for complete search history.

(56) References Cited

U.S. PATENT DOCUMENTS

| | | | |
|---|---|---|---|
| 5,054,911 A | 10/1991 | Ohishi et al. | |
| 5,075,878 A | 12/1991 | Ohtomo et al. | |
| 5,218,289 A | 6/1993 | Besson | |
| 5,566,139 A | 10/1996 | Abshire | |
| 6,587,187 B2* | 7/2003 | Watanabe et al. | 356/5.01 |
| 2001/0012104 A1* | 8/2001 | Dunne | 356/5.1 |

FOREIGN PATENT DOCUMENTS

| | | |
|---|---|---|
| EP | 0 348 898 A2 | 1/1990 |
| EP | 1 061 336 A2 | 12/2000 |
| JP | 62-063885 | 3/1987 |
| JP | 63-085489 | 4/1988 |
| JP | 02-077673 | 3/1990 |
| JP | 08-122465 | 5/1996 |
| JP | 2916780 | 7/1999 |

\* cited by examiner

*Primary Examiner*—Isam Alsomiri
(74) *Attorney, Agent, or Firm*—Chapman & Cutler LLP

(57) ABSTRACT

A time difference measuring device can accurately measure a time difference between two pulse signals generated with a predetermined time difference by measuring the two pulse signals by one measurement. The time difference measuring device measures a time difference between a start signal (M1) and a stop signal (M2). The device has a reference signal generation unit (41) for generating two reference signals (S1, S2) having a π/2 phase difference. According to corresponding amplitude values (A11, A12) and (A21, A22) of the reference signals (S1, S2) at each generation timing of the start signal (M1) and the stop signal (M2), a phase difference detection unit (42) calculates a phase difference Δθ (=θstop−θstart) between the generation timings of the pulse signals (M1, M2). According to the detected phase difference Δθ and the cycle (Ts) of the reference signals (S1; S2), a time difference calculation unit (44) calculates the generation time difference Δt between the pulse signals (m1, M2).

19 Claims, 10 Drawing Sheets

TIME DIFFERENCE MEASURING DEVICE, MEASURING METHOD, DISTANCE MEASURING DEVICE, AND DISTANCE MEASURING METHOD

TECHNICAL FIELD

The present invention relates to a time difference measuring device, time difference measuring method, distance measuring device, and distance measuring method, specifically to an improvement on the measurement of a time difference between pulse signals having an extremely short time interval.

BACKGROUND ART

The distance measuring device representing a recent surveying instrument emits a measuring wave such as laser beams or microwaves to a distance measuring object, detects a reflected wave from the distance measuring object (hereinafter, generally named as a measuring wave), calculates a to-and-fro travel distance of the measuring wave on the basis of a time difference between an emission time and a detection time of the measuring wave, and thereby calculates the distance to the distance measuring object.

Here, the measurement of a time difference (time interval) has been performed, for example, by generating a high frequency clock signal having an extremely short already-known cycle, in comparison to a time difference between an emission time of a measuring wave and a detection time thereof, counting the clock number of the high frequency clock signal which are generated between the emission time and the detection time of the measuring wave, and multiplying the counted number by the cycle. However this measurement needs to raise the frequency of the clock signal in order to enhance the measurement accuracy; and yet, it embraces a limitation of raising the frequency of the clock signal.

Accordingly, a method has been developed which generates plural high frequency clock signals mutually having predetermined phase differences, counts the clock number of the clock signals each, and thereby brings the frequencies of the clock signals into high frequencies artificially. However, this method needs measurement repetitions corresponding to the number of the generated clock signals in enhancing the reliability of measurement accuracy, which makes the measurement time longer and invites a problem in practical use.

Accordingly, the present applicant has proposed a technique which generates a start signal synchronized with an emission time of a measuring wave and a stop signal synchronized with a detection time thereof repeatedly plural times with predetermined time intervals each, samples a reference signal of a sine wave or the like generated in a shorter cycle than this repetition cycle with a repetitive start signal, samples it with a repetitive stop signal, calculates a phase difference of a first sampling wave acquired by the sampling with the start signal and a second sampling wave acquired by the sampling with the stop signal, calculates a phase difference between the start signal and the stop signal based on this phase difference, and converts the acquired phase difference into a time difference (PATENT DOCUMENT 1).

PATENT DOCUMENT 1: Japanese Patent Registration No. 2916780 Bulletin

DISCLOSURE OF THE INVENTION

Problems to Be Solved By the Invention

However, the above proposed technique requires generating the start signal and the stop signal plural times and detecting the signals plural times, which is disadvantageous to a further speed-up of measurement.

Especially, in case of the above technique not being applied to a distance measuring device that measures a distance to a fixed measuring object provided with a cube corner, but being applied to a distance measuring device intending to include a natural object likely to be displaced by environmental influences such as a wind in the measuring object, or being applied to a distance measuring device that performs distance measurements to the outline of a distance measuring object point by point to specify the whole figure of the distance measuring object, a further shortening of individual measuring times is demanded.

The natural object is apt to be displaced by environmental influences; and if there occurs a displacement during repetitive measurements, part of plural data acquired by plural measurements include errors by the displacement, and such data deteriorate the reliability of measurement. Therefore, such data are needed to be excluded from an averaging calculation of those plural data and so forth.

And in case of specifying the outline figure by scanning the outline of an object point by point, the number of objective points in the distance measurement increases tremendously, which requires a long measurement time for the distance measurement of the whole outline.

Further in the above proposed technique, plural start signals and plural stop signals each function as the sampling signals; the generation time interval between the start signals and the generation time interval between the stop signals are required to be precisely constant, and a control to maintain the generation time interval at a constant becomes necessary as well.

The present invention has been made in view of the above circumstances, and aims to provide a time difference measuring device, time difference measuring method, distance measuring device using the time difference measuring device, and distance measuring method using the time difference measuring method, which precisely measures the time difference of two pulse signals generated with a predetermined time difference by one measurement without repeatedly generating these two pulse signals.

Means for Solving the Problems

The first time difference measuring device according to the present invention is a time difference measuring device which measures a time difference of two or more pulse signals generated with a predetermined time difference, the time difference measuring device is characterized by comprising: a reference signal generation means configured to generate one or more reference signals; an amplitude detection means configured to obtain two amplitudes based on the reference signals so as to be substantially equal to sampling the reference signals, at predetermined two timings which depend on generation timings of each of the pulse signals; a phase difference detection means configured to calculate a phase difference between the generation timings of the pulse signals on the basis of each of the amplitudes of the reference signals obtained for each of the pulse signals, detected by the amplitude detection means; and a time difference calculation means configured to calculate a generation time difference of the two pulse signals on the basis of the phase difference detected by the phase difference detection means and a cycle of the reference signals.

Here, "obtain two amplitudes based on the reference signals so as to be substantially equal to sampling the reference signals, in predetermined two timings which depend on generation timings of each of the pulse signals" means the following. When the number of the reference signals generated by the reference signal generation means is two, and the two reference signals have a predetermined phase difference, for example, the one reference signal is displaced in the amplitude to the other reference signal by a time equivalent to the phase difference. Sampling both the reference signals simultaneously at the predetermined timings can be estimated substantially equal to sampling a single reference signal at two different timings of a generation timing of the pulse signal and another timing displaced by the time difference (equivalent to the predetermined phase difference of the reference signal) from the generation timing. Therefore, this means that a single reference signal can be sampled at two different timings, or two reference signals having a phase difference can be sampled at a single timing.

According to the first time difference measuring device of the invention thus constructed, the generation timings of each of the pulse signals can be expressed as the phases in the reference signals, on the basis of the two amplitudes that can be estimated to be sampled at two different timings by each of the pulse signals. The phase differences acquired by each of the pulse signals can be expressed as the time differences of the generation timings of the pulse signals, using the cycle of the reference signals.

The first time difference measuring device according to the invention is provided with the time difference calculation means that calculates the generation time difference of the two pulse signals on the basis of the phase difference detected by the phase difference detection means and the cycle of the reference signals; therefore, one-time detection of each of the reference signals at the generation timings each of the two pulse signals will determine the time difference between both the pulse signals, which makes a quick measurement possible.

It is preferable to apply a sine wave signal or a cosine wave signal, for example, to the reference signal. The reason is that the correspondence between amplitude and phase is general. However, the reference signal is not restricted to the sine wave signal or cosine wave signal. Various signals can be applied, such as a triangle wave signal, saw tooth wave signal, and so forth, as long as the correspondence between amplitude and phase is stipulated in advance by means of a look-up table or a function table or the like.

The second time difference measuring device according to the invention is a time difference measuring device which measures a time difference of two pulse signals generated with a predetermined time difference, the time difference measuring device is characterized by comprising: a reference signal generation means configured to generate at least two reference signals having a phase difference of virtually $\pi/2$ [rad] (including the odd number-times of virtually $\pi/2$[rad] ($\pi/2$[rad]$\times$(2n$-$1); n=1, 2, . . . , the same hereinafter); a phase difference detection means configured to calculate a phase difference of generation timings of the two pulse signals, on the basis of amplitudes of at least the two reference signals at each of the generation timings of the two pulse signals; and a time difference calculation means configured to calculate a generation time difference of the two pulse signals, on the basis of the phase difference detected by the phase difference detection means and a cycle of the reference signals.

Here, the two reference signals may be or may not be synchronous with the pulse signals.

According to the second time difference measuring device thus constructed, the phase difference detection means performs sampling only one time at the generation timings each of the two pulse signals generated with a time difference, to the two reference signals having the phase difference of $\pi/2$ [rad] that the reference signal generation means generates, and detects the amplitudes of the reference signals at each sampling.

Further, the phase difference detection means calculates the phases of the reference signals at each of the timings, on the basis of the relation of amplitude such as an amplitude difference or an amplitude ratio between the two reference signals at each of the timings acquired, calculates the difference of the phases each corresponding to the two timings acquired, and calculates a generation time difference of the two pulse signals by this phase difference and the cycle of the reference signals.

Therefore, one-time detection of each of the reference signals at the generation timings each of the two pulse signals will determine the time difference between both the pulse signals, which makes a quick measurement possible.

Applying such signals as a sine wave signal and a cosine wave signal, of which phase difference is $\pi/2$[rad], to the reference signals, calculating a ratio of directly detected values (amplitudes), and calculating an arc tangent of the ratio will produce a phase $\theta$. Then, from the two phases thus obtained, the phase difference $\Delta\theta$ can be detected.

The variations in time of the phase calculated by the arc tangent always become constant; therefore, regardless of the generation timings of the two pulse signals to the reference signals, a constant resolution and detection sensitivity can be acquired.

The reason is as follows. The variation of the sine wave signal (sin $\theta$) to the variation of $\theta$ is significant near a position where the vibration thereof crosses the center (sin $\theta$=0) of the amplitude; therefore, a high detection sensitivity (resolution) can be acquired when detected at this position. In contrast, the variation of sin $\theta$ to the variation of $\theta$ is insignificant near a peak position of the vibration; therefore, the detection sensitivity (resolution) at this position becomes low. On the other hand, since the cosine wave signal has the phase difference of $\pi/2$[rad] to the sine wave signal, when the detection sensitivity of the sine wave signal becomes low, the detection sensitivity (resolution) of the cosine wave signal becomes high. Therefore, the phase calculated by the arc tangent based on the ratio of both is continually detected with a high detection sensitivity and high resolution.

The second time difference measuring device according to the invention preferably further includes a coarse time difference detection means configured to detect a coarse generation time difference of the two pulse signals, wherein the time difference calculation means is configured to calculate, in addition to a precise time difference calculated on the basis of the phase difference detected by the phase difference detection means and the cycle of the reference signals, a generation time difference of the two pulse signals by the coarse generation time difference detected by the coarse time difference detection means.

The coarse time difference detection means is only needed to be capable of detecting a time with the resolution of virtually one cycle of the above reference signals, to which can be applied one that detects a coarse time difference by counting the pulse number of the reference signals, using a well-known pulse counter and the like.

According to the time difference measuring device provided with such preferable construction, since the coarse generation time difference of the two pulse signals can be detected by the coarse time difference detection means, the generation time difference of the two pulse signals can be measured precisely, even if the time difference is as long as it exceeds one cycle of the reference signals.

The reason is as follows. The phase difference $\Delta\theta$ of the reference signals corresponding to a time difference between the two pulse signals detected by the time difference calculation means is calculated as a value within $0[rad]$ to $2\pi[rad]$. However, since the reference signals are a periodic signal, and the phase difference $\Delta\theta$ latently includes $2\pi+\Delta\theta$, $4\pi+\Delta\theta, \ldots$, in addition to $\Delta\theta \leq 2\pi$, the phase difference can be expressed as the general formula: $2\pi(n-1)+\Delta\theta$ (n: natural number).

On the other hand, the generation time difference of the two pulse signals needs to be calculated including the phase difference $2\pi(n-1)[rad]$ being the first term of the above general formula as a time; and the natural number n is required to be specified.

Now, even if the generation time difference of the two pulse signals exceeds one cycle ($2\pi[rad]$) of the reference signal, the coarse time difference detection means is able to detect the generation time difference in brief with the resolution of virtually one cycle of the reference signal. On the basis of the generation time difference briefly detected by the coarse time difference detection means, the phase difference $2\pi(n-1)[rad]$ of the first term of the general formula can be specified, and the time corresponding to the phase difference as the total of the first term and the second term ($[2\pi(n-1)+\Delta\theta]/2\pi$ multiplied by the periodic time [sec] of the reference signal), that is, the generation time difference of the two pulse signals can be obtained specifically as a unique value.

Further, in the first or the second time difference measuring device according to the invention, it is preferable to apply a sine wave and a cosine wave to the two reference signals.

The combination of the sine wave ($A0 \sin \theta$) and the cosine wave ($A0 \cos \theta$) is equivalent to the combination of two sine waves having the phase difference of $\pi/2[rad]$ or the combination of two cosine waves having the phase difference of $\pi/2[rad]$. These two reference signals are sampled by the pulse signals to acquire a detected value Aij (amplitude); and the ratio ($A0 \sin \theta/A0 \cos \theta$) of the amplitude can be calculated as the tangent value ($\tan \theta$). An inversion of the acquired tangent value (inverse trigonometric function $\tan^{-1}\theta$ (=arctan)) will calculate the phase. Then, applying the sine and cosine waves to the reference signals in this manner will cancel the maximum amplitude $A0$ of the sine and cosine waves in the calculation; thereby, it is possible to perform the arithmetic processing without practically calculating the maximum amplitude $A0$, which leads to simplifying the arithmetic processing.

Moreover, the variations in time of the phase calculated by the arc tangent always become constant; therefore, regardless of the generation timings of the two pulse signals to the reference signals, a constant resolution and detection sensitivity can be acquired.

In the second time difference measuring device according to the invention, it is preferable that the phase difference detection means is configured to detect an amplitude A11 ($-A0 \leq A11 \leq A0$) of the sine wave signal and an amplitude A12 ($-A0 \leq A12 \leq A0$) of the cosine wave signal, at the generation timing of one pulse signal (start signal) preceding in time series of the two pulse signals, calculate a ratio A11/A12 of the amplitudes A11, A12, calculate a phase $\theta$start (phase of the sine wave and cosine wave at the generation timing of the start signal) on the basis of the amplitude ratio A11/A12 by $\tan^{-1}(A11/A12)$, detect an amplitude A21 ($-A0 \leq A21 \leq A0$) of the sine wave signal and an amplitude A22 ($-A0 \leq A22 \leq A0$) of the cosine wave signal, at the generation timing of the other pulse signal (stop signal) succeeding in time series of the two pulse signals, calculate a ratio A21/A22 of the amplitudes A21, A22, calculate a phase $\theta$stop (phase of the sine wave and cosine wave at the generation timing of the stop signal) on the basis of the amplitude ratio A21/A22 by $\tan^{-1}(A21/A22)$, and calculate a phase difference $\Delta\theta$ of the reference signals corresponding to a time between the generation timings of the two pulse signals by ($\theta$stop$-\theta$start).

According to the time difference measuring device thus constructed, the time difference can be calculated with high precision by a simple arithmetic processing.

In the first or the second time difference measuring device according to the invention, it is preferable that the reference signal generation means is configured to originally generate one reference signal, generate a new reference signal of which phase is delayed by virtually $\pi/2[rad]$ to the reference signal originally generated, and generate the originally generated reference signal and the new reference signal, as the two reference signals having the phase difference of virtually $\pi/2[rad]$.

Although the reference signal originally generated by the reference signal generation means is only one, the originally generated reference signal as well as the new reference signal of which phase is delay by virtually $\pi/2[rad]$ to the original reference signal may be outputted as the two reference signals.

Thus, provided one is original and the other one is a generation based on the original one, of the two reference signals, the difference of the signal waveforms, for example, the difference of the amplitudes are not likely to generate between the reference signals, and the errors in calculating the phases corresponding to the amplitudes are likely to be suppressed.

The time difference measuring method according to the invention is A time difference measuring method which measures a time difference of two pulse signals generated with a predetermined time difference, the method is characterized by comprising: detecting a coarse generation time difference of the two pulse signals; generating a sine wave signal and a cosine wave signal having the phase difference of virtually $\pi/2$ (including the odd number-times of virtually $\pi/2[rad]$ ($\pi/2[rad]\times(2n-1)$; n=1, 2, . . . , the same hereinafter) as two reference signals; obtaining, on the basis of the amplitudes of the sine wave signal and the cosine wave signal at each of generation timings of the two pulse signals, a phase difference of the generation timings of the two pulse signals; and calculating a generation time difference of the two pulse signals, on the basis of the obtained phase difference and a cycle of the reference signals and the coarse generation time difference.

According to the time difference measuring method thus constructed, the two reference signals having the phase difference of virtually $\pi/2[rad]$ is sampled only one time at each of the generation timings of the two pulse signals generated with a time difference, and the amplitudes of the reference signals are detected at each sampling.

Further, the phases of the reference signals are calculated at each of the timings acquired, on the basis of the relation of amplitude such as an amplitude difference or an amplitude ratio between the two reference signals at each of the timings, the difference of the phases each corresponding to the two timings acquired is calculated, and a generation time difference of the two pulse signals is calculated by this phase difference and the cycle of the reference signals.

Therefore, one-time detection of each of the reference signals at the generation timings each of the two pulse signals will determine the time difference between both the pulse signals, which makes a quick measurement possible.

Since the reference signals are the sine wave signal and cosine wave signal that have the phase difference of $\pi/2$[rad], calculating the ratio of directly detected values (amplitudes), and calculating the arc tangent of the ratio will produce a phase $\theta$. Then, from the two phases thus obtained, the phase difference $\Delta\theta$ can be detected.

The variations in time of the phase calculated by the arc tangent always become constant; therefore, regardless of the generation timings of the two pulse signals to the reference signals, a constant resolution and detection sensitivity can be acquired.

By detecting the coarse generation time difference of the two pulse signals, the generation time difference of the two pulse signals can be measured precisely, even if the time difference is as long as it exceeds one cycle of the reference signal.

In the time difference measuring method according to the invention, it is preferable to detect an amplitude A11 of the sine wave signal and an amplitude A12 of the cosine wave signal, at the generation timing of one pulse signal preceding in time series of the two pulse signals, to calculate a ratio A11/A12 of the amplitudes A11, A12, to calculate a phase $\theta$start on the basis of the amplitude ratio A11/A12 by $\tan^{-1}$(A11/A12), to detect an amplitude A21 of the sine wave signal and an amplitude A22 of the cosine wave signal, at the generation timing of the other pulse signal succeeding in time series of the two pulse signals, to calculate a ratio A21/A22 of the amplitudes A21, A22, to calculate a phase $\theta$stop on the basis of the amplitude ratio A21/A22 by $\tan^{-1}$(A21/A22), and to calculate a phase difference $\Delta\theta$ of the reference signals corresponding to a time between the generation timings of the two pulse signals by ($\theta$stop−$\theta$start).

According to the time difference measuring method with a preferable construction, the time difference can be calculated with high precision by a simple arithmetic processing.

The first distance measuring device according to the invention is characterized by comprising: a measuring wave emission means configured to emit a measuring wave to an object to be distance-measured; a reflected wave detection means configured to detect a reflected wave acquired by the measuring wave reflected by the distance measuring object; and a distance measuring means configured to acquire a first pulse signal at a timing of the measuring wave emitted from the measuring wave emission means, acquire a second pulse signal at a timing of the reflected wave detected by the reflected wave detection means, and obtain a distance to the distance measuring object on the basis of a time difference from the timing of the first pulse signal acquired to the timing of the second pulse signal acquired, and wherein the distance measuring means includes the time difference measuring device according to the present invention, and configured to obtain the distance to the distance measuring object on the basis of a time difference of the first pulse signal and the second pulse signal measured by the time difference measuring device.

Here, the distance measuring device includes the so-called surveying instrument and a figure measuring device that specifies the outline figure of a distance measuring object by performing distance measurements to the distance measuring object as well.

Various well-known electromagnetic waves conventionally used as a distance measuring beam, such as microwaves, light waves (laser beams, infrared light, etc.), etc. can be applied to a signal wave that the measuring wave emission means emits to the distance measuring object.

According to the first distance measuring device of the invention thus constructed, the distance measuring means is provided with the time difference measuring device according to the invention; and the time difference measuring device needs to perform one-time detection of each of the reference signals at the generation timings each of the first and second pulse signals, so that the time difference between both the pulse signals can be measured quickly, and the distance measuring performance based on the measurement of the time difference can be quickened.

Applying such signals as a sine wave signal and a cosine wave signal, of which phase difference is $\pi/2$[rad], to the reference signals, calculating a ratio of directly detected values (amplitudes), and calculating an arc tangent of the ratio will produce a phase $\theta$. Then, from the two phases thus obtained, the phase difference $\Delta\theta$ can be detected.

The variations in time of the phase calculated by the arc tangent always become constant; therefore, regardless of the generation timings of the two pulse signals to the reference signals, a constant resolution and detection sensitivity can be acquired.

The distance measuring method according to the invention is characterized by comprising; emitting a measuring wave to an object to be distance-measured; acquiring a first pulse signal at a timing of the measuring wave emitted; detecting a reflected wave acquired by the measuring wave reflected by the distance measuring object; acquiring a second pulse signal at a timing of the reflected wave detected; and obtaining a distance to the distance measuring object on the basis of a time difference from the timing of the first pulse signal acquired to the timing of the second pulse signal acquired, and wherein the distance to the distance measuring object is obtained on the basis of the time difference between the first pulse signal and the second pulse signal acquired by the time difference measuring method according to the present invention.

According to the distance measuring method of the invention thus constructed, only one-time detection of each of the reference signals at the generation timings each of the first and second pulse signals, by the aforementioned time difference measuring method, will quickly measure the time difference between both the pulse signals; therefore, the distance measuring performance based on the measurement of the time difference can be quickened.

Applying such signals as a sine wave signal and a cosine wave signal, of which phase difference is $\pi/2$[rad], to the reference signals, calculating a ratio of directly detected values (amplitudes), and calculating an arc tangent of the ratio will produce a phase $\theta$. Then, from the two phases thus obtained, the phase difference $\Delta\theta$ can be detected.

The variations in time of the phase calculated by the arc tangent always become constant; therefore, regardless of the generation timings of the two pulse signals to the reference signals, a constant resolution and detection sensitivity can be acquired.

The third time difference measuring device according to the present invention is a time difference measuring device which measures a time difference of two or more pulse signals generated with a predetermined time difference, the time difference measuring device is characterized by comprising: a reference signal generation means configured to generate a single reference signal; an amplitude detection means configured to obtain amplitudes of the reference signal at generation timings of each of the pulse signals and predetermined delay timings corresponding to the generation timings; a phase difference detection means configured to calculate a phase difference between the generation timings of the pulse signals on the basis of each of the amplitudes of the reference signal at the generation timings and the delay timings obtained for each of the pulse signals, detected by the amplitude detection means; and a time difference calculation means configured to calculate a generation time difference of the two pulse signals, on the basis of the phase difference detected by the phase difference detection means and a cycle of the reference signal.

According to the time difference measuring device thus constructed, the amplitude detection means samples a single reference signal generated by the reference signal generation means at the generation timings of the pulse signals and at a timing corresponding to a phase difference equivalent to the predetermined delay timings from the generation timings, and detects the amplitudes of the reference signal corresponding to each of the timings.

Further, the phase difference detection means is configured to calculate the phase of the reference signal at the generation timing of one pulse signal on the basis of the relation of amplitude such as an amplitude difference or an amplitude ratio between the two reference signals at each of the timings acquired, calculate in the same manner the phase of the reference signal at the generation timing of the other pulse signal, calculate the difference of the two phases acquired, and calculate a generation time difference of the two pulse signals by this phase difference and the cycle of the reference signal.

Therefore, one-time detection of the reference signal at each of the generation timings and delay timings of the two pulse signals will determine the time difference between both the pulse signals, which makes a quick measurement possible.

Applying a sine wave signal and a cosine wave signal to the reference signal, for example, applying the timings corresponding to the phase delays equivalent to the phase difference of $\pi/2[rad]$ of the reference signal (including the odd number-times of virtually $\pi/2[rad]$ ($\pi/2[rad]\times(2n-1)$; n=1, 2, . . . ), the same hereinafter) to the delay timings, calculating the ratio of directly detected values (amplitudes) at the generation timings and the delay timings of each of the pulse signals, and calculating the arc tangent of the ratio will produce a phase $\theta$ of each of the pulse signals. Then, from the two phases thus obtained, the phase difference $\Delta\theta$ can be detected.

The variations in time of the phase calculated by the arc tangent always become constant; therefore, regardless of the generation timings of the two pulse signals to the reference signal, a constant resolution and detection sensitivity can be acquired.

The reason is as follows. The variation of the sine wave signal ($\sin\theta$) to the variation of $\theta$, for example, is significant near a position where the vibration thereof crosses the center ($\sin\theta=0$) of the amplitude, and a high detection sensitivity (resolution) can be acquired when detected at this position. In contrast, the variation of $\sin\theta$ to the variation of $\theta$ is insignificant near a peak position of the vibration, and the detection sensitivity (resolution) at this position becomes low. The delay timings, on the other hand, assume the phase difference of $\pi/2[rad]$ from the phase equivalent to that near the peak position of the vibration; and the vibration thereof is equivalent to that near a position of crossing the center ($\sin\theta=0$) of the amplitude, and a high detection sensitivity (resolution) is acquired. Therefore, the phase calculated by the arc tangent based on the ratio of each of the amplitudes detected at the generation timings and delay timings is continually detected with a high detection sensitivity and high resolution.

The second distance measuring device according to the invention is characterized by comprising: a measuring wave emission means configured to emit a measuring wave to an object to be distance-measured; a reflected wave detection means configured to detect a reflected wave acquired by the measuring wave reflected by the distance measuring object; and a distance measuring means configured to acquire a first pulse signal at a timing of the measuring wave emitted from the measuring wave emission means, acquire a second pulse signal at a timing of the reflected wave detected by the reflected wave detection means, and obtain a distance to the distance measuring object on the basis of a time difference from the timing of the first pulse signal acquired to the timing of the second pulse signal acquired, and wherein the distance measuring means includes the time difference measuring device according to the present invention, and configured to obtain the distance to the distance measuring object on the basis of a time difference of the first pulse signal and the second pulse signal measured by the time difference measuring device.

Here, the distance measuring device includes the so-called surveying instrument and a figure measuring device that specifies the outline figure of a distance measuring object by performing distance measurements to the distance measuring object as well.

Various well-known electromagnetic waves conventionally used as a distance measuring beam, such as microwaves, light waves (laser beams, infrared light, etc.), etc. can be applied to a signal wave that the measuring wave emission means emits to the distance measuring object.

According to the second distance measuring device of the invention thus constructed, the distance measuring means is provided with the aforementioned time difference measuring device according to the invention; and the time difference measuring device only needs to perform one-time detection of the reference signal at each of the generation timings and delay timings of the first and second pulse signals, so that the time difference between both the pulse signals can be measured quickly, and the distance measuring performance based on the measurement of the time difference can be quickened.

Applying a sine wave signal or a cosine wave signal to the reference signal, for example, applying virtually $\pi/2[rad]$ to the phase difference corresponding to a time between the generation timing and the delay timing, calculating the ratio of directly detected values (amplitudes), and calculating the arc tangent of the ratio will produce a phase $\theta$. Then, from the two phases thus obtained, the phase difference $\Delta\theta$ can be detected.

The variations in time of the phase calculated by the arc tangent always become constant; therefore, regardless of the generation timings of the two pulse signals to the reference signal, a constant resolution and detection sensitivity can be acquired.

EFFECT OF THE INVENTION

According to the time difference measuring device and the time difference measuring method of the invention, one-time detection of each of the reference signals at the generation timings each of the two pulse signals or one-time detection of the reference signal at each of the generation timings and delay timings of the two pulse signals will determine the time difference between both the pulse signals, and the distance measuring performance can be quickened.

According to the distance measuring device and the distance measuring method of the invention, the distance measuring means is provided with the aforementioned time difference measuring device according to the invention; and the time difference measuring device only needs to perform one-time detection of each of the reference signals at the generation timings each of the first and second pulse signal, or to perform one-time detection of the reference signal at each of the generation timings and the delay timings of the two pulse signals, so that the time difference between both the pulse signals can be measured quickly. Thereby, the distance measurement based on this time difference measurement can be quickened.

EXPLANATION OF THE REFERENCE NUMERALS

10: Measuring light emission means (measuring wave emission means)
11: PLD (light source)
20: Reflected light detection means (reflected wave detection means)
21: Photo detection element
30: Distance measuring means
40: Time difference measuring device
90: Distance measuring object
100: Surveying device (distance measuring device)
L1: Laser beam
L2: Reflected laser beam
M1: Start signal (first pulse signal)
M2: Stop signal (second pulse signal)
S1, S2: Reference signal
A11, A12, A21, A22: Amplitude

BEST MODE FOR CARRYING OUT THE INVENTION

The best modes of the time difference measuring device, time measuring method, distance measuring device, and distance measuring method according to the invention will now be described with reference to the appended drawings.

EMBODIMENT 1

Figure 1:
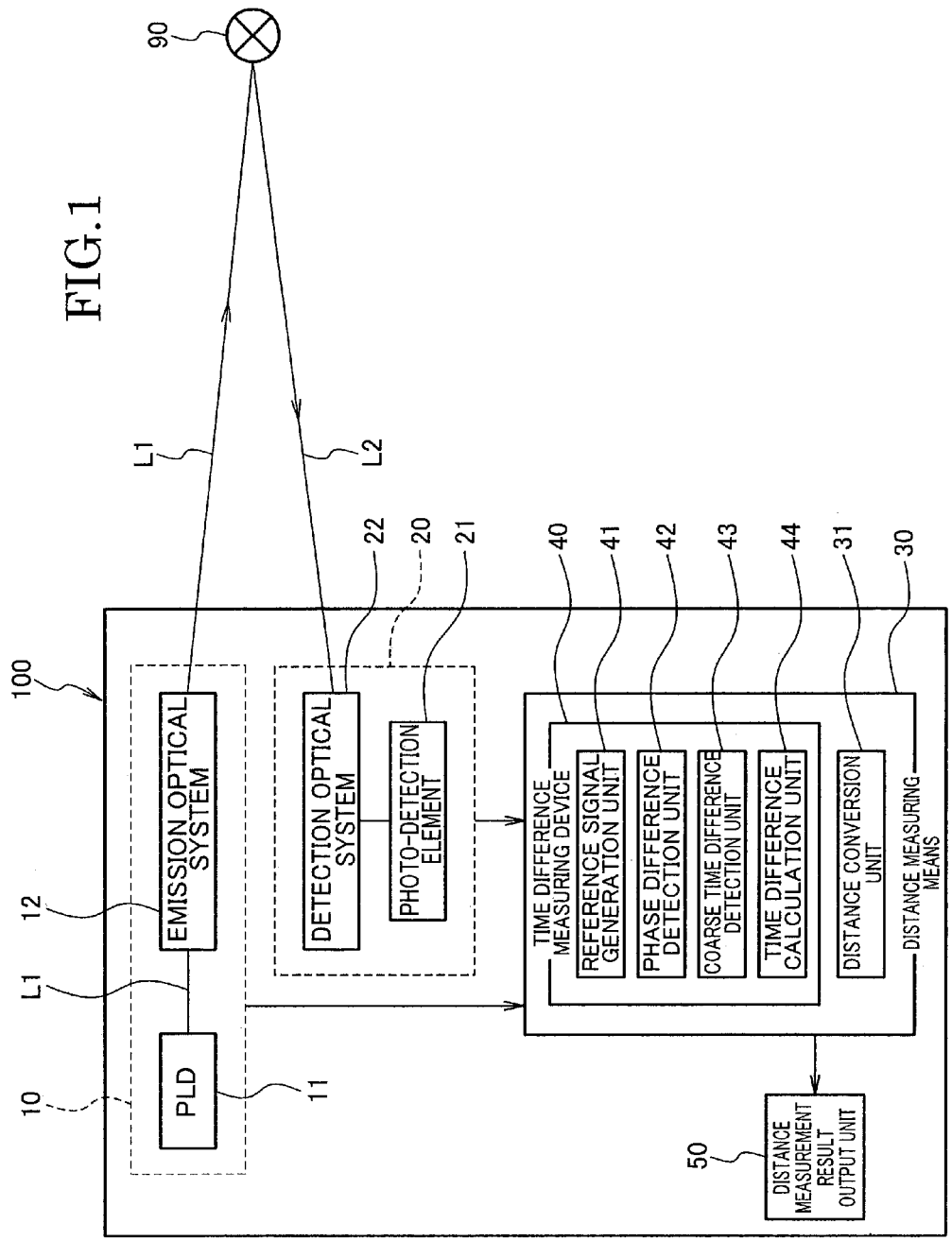
FIG. 1 is a block diagram illustrating a surveying device including the time difference measuring device according to one embodiment of the present invention.

FIG. 1 is a block diagram illustrating the construction of a surveying device 100 being one embodiment of a distance measuring device according to the invention, which includes a time difference measuring device of the invention as a part of a distance measuring means.

The surveying device 100 illustrated in FIG. 1 includes a measuring light emission means 10 (measuring wave emission means) that emits a pulse laser beam L1 as a measuring wave to a distance measuring object 90, a reflected light detection means 20 (reflected wave detection means) that detects a reflected laser beam L2 (reflected wave) acquired by the laser beam L1 reflecting on the distance measuring object 90, a distance measuring means 30, and a distance measurement result output unit 50. Here, the distance measuring means 30 outputs a pulse start signal M1 (first pulse signal) at a timing of the laser beam L1 being emitted from the measuring light emission means 10, outputs a pulse stop signal M2 (second pulse signal) at a timing of the reflected laser beam L2 being detected by the reflected light detection means 20, and calculates a distance to the distance measuring object 90 on the basis of a time difference $\Delta t$ from the timing of the start signal M1 being outputted to the timing of the stop signal M2 being outputted. Then, the distance measurement result output unit 50 outputs the result of this distance measurement in a visible form.

The measuring light emission means 10 includes a semiconductor laser (PLD) 11 being a light source that emits the pulse laser beam L1, and an emission optical system 12 including lenses and so forth that guide the laser beam L1 emitted from the PLD 11 toward the distance measuring object 90. The laser beam L1 emitted from the PLD 11 has a comparably high peak power, and is a pulse laser beam of which duty ratio is about 0.01%.

The reflected light detection means 20 includes a photo-detection element 21 that detects the reflected laser beam L2, and a detection optical system 22 that guides the reflected laser beam L2 to the photo-detection element 21. Here, the photo-detection element 21 may be any element that is capable of detecting the pulse reflected laser beam L2, for which can be used an avalanche photo-diode (APD), for example.

The distance measuring means 30 includes a time difference measuring device 40 that measures an output time difference $\Delta t$ between the two pulse signals M1, M2 that are internally outputted at a detection timing of the laser beam L1 and a detection timing of the reflected laser beam L2, and a distance conversion unit 31 that converts the measured time difference $\Delta t$ into the distance and outputs the result.

The time difference measuring device 40 internally generates the above two pulse signals M1, M2. Further, the time difference measuring device 40 includes a reference signal generation unit 41 (reference signal generation means) that generates two reference signals S1, S2, of which phase difference is $\pi/2$, a phase difference detection unit 42 (phase difference detection means), a coarse time difference detection unit 43 (coarse time difference detection means) that detects a coarse time difference "ta" between the generation timings of the two pulse signals M1, M2 each, and a time difference calculation unit 44 (time difference calculation means). Here, the phase difference detection unit 42 calculates a phase difference $\Delta\theta$ of the reference signal S1 (or reference signal S2) between the generation timings of the two pulse signals M1, M2 each, on the basis of an amplitude A11 (amplitude of the reference signal S1 at the generation timing of the start signal M1), an amplitude A12 (amplitude of the reference signal S2 at the generation timing of the start signal M1), an amplitude A21 (amplitude of the reference signal S1 at the generation timing of the stop signal M2), and an amplitude A22 (amplitude of the reference signal S2 at the generation timing of the stop signal M2). Then, the time difference calculation unit 44 calculates a generation time difference Δt of the start signal M1 and the stop signal M2, on the basis of the phase difference Δθ detected by the phase difference detection unit 42, a cycle Ts of the reference signals S1, S2, and the coarse time difference ta detected by the coarse time difference detection unit 43.

As the reference signals S1, S2 in this embodiment, a sine wave signal (A0 sin θ; A0 represents the maximum amplitude) is applied to the reference signal S1, and a cosine wave signal (A0 cos θ) is applied to the reference signal S2, which is equivalent to a sine wave signal (A0 sin (θ+π/2)) having the phase difference of π/2 to the sine wave reference signal S1, for example. However, the reference signals S1, S2 are not restricted to the combination of the sine wave and cosine wave signals, and any combinations of the other signals may be used, provided that the reference signals S1, S2 are of two periodic functions mutually having the phase difference of π/2.

The coarse time difference detection unit 43 is only needed to be capable of detecting a time with the resolution of about one cycle Ts of the reference signals S1, S2, to which can be applied one that detects a coarse time difference ta (=Pc×Ts) by counting the pulse number Pc of the reference signal S1 or S2 using a well-known pulse counter or the like, for example.

The distance measurement result output unit 50 may be a display device such as a monitor that delivers display outputs or a printer that delivers print outputs, provided that it outputs a distance measurement result in a visible form.

Figure 2:
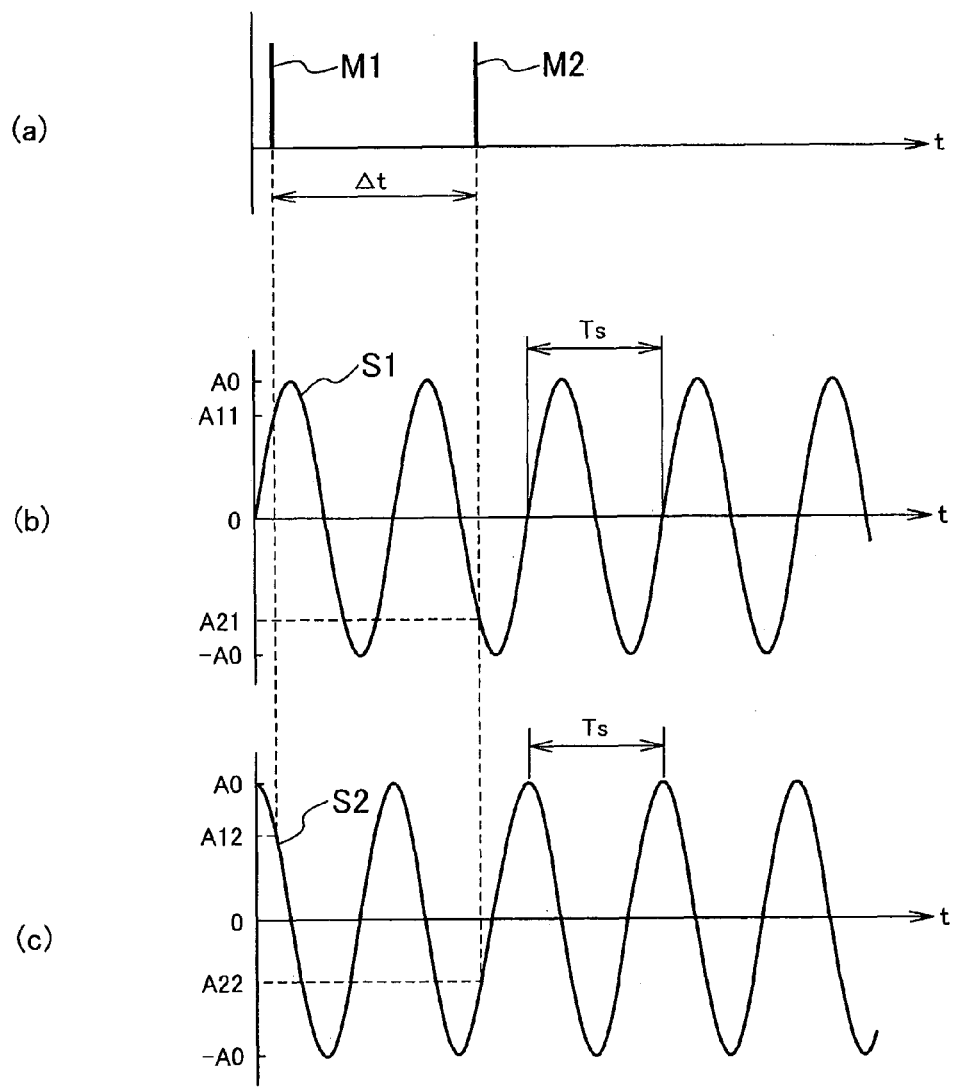
FIG. 2 is a chart explaining the principle of time difference measurement.

Next, the calculation principle of the generation time difference Δt between the start signal M1 and the stop signal M2 by the time difference measuring device 40 of the surveying device 100 in this embodiment will be described with reference to FIG. 2.

In the first place, the reference signal generation unit 41 of the time difference measuring device 40 generates a sine wave signal S1 illustrated in FIG. 2(b) and a cosine wave signal S2 illustrated in FIG. 2(c).

Next, the time difference measuring device 40 generates the start signal M1 illustrated in FIG. 2(a) at an emission timing of the laser beam L1 from the PLD 11, and the phase difference detection unit 42 samples and holds both the reference signals S1, S2 by the start signal M1. The amplitudes A11, A12 of the reference signals S1, S2 acquired by sampling and holding are illustrated in FIG. 2(d), and they are expressed as follows, using the phase θstart from the generation time of these reference signals.

$A11 = A0 \sin \theta start$ (1)

$A12 = A0 \cos \theta start$ (2)

Consequently, $A11/A12 = \tan \theta start$ (3)

Therefore, the phase difference detection unit 42 calculates the phase θstart of the reference signals S1, S2 at the generation time of the start signal M1, by $\theta start = \tan^{-1}(A11/A12)$ (4)

The phase difference detection unit 42 temporarily stores this calculation result in a storage area not illustrated.

Further, the time difference measuring device 40 generates the stop signal M2 illustrated in FIG. 2(a) at a detection timing of the reflected laser beam L2 by the photo-detection element 21, and the phase difference detection unit 42 samples and holds both the reference signals S1, S2 by the stop signal M2. The amplitudes A21, A22 of the reference signals S1, S2 acquired by sampling and holding are illustrated in FIG. 2(d), and they are expressed as follows, using the phase θstop from the generation time of these reference signals.

$A21 = A0 \sin \theta stop$ (5)

$A22 = A0 \cos \theta stop$ (6)

Consequently, $A21/A22 = \tan \theta stop$ (7)

Therefore, the phase difference detection unit 42 calculates the phase θstop of the reference signals S1, S2 at the generation time of the stop signal M2, by $\theta stop = \tan^{-1}(A21/A22)$ (8)

The phase difference detection unit 42 temporarily stores this calculation result in a storage area not illustrated.

Then, the phase difference detection unit 42 reads out the two phases θstart, θstop stored in the storage area, and calculates the phase difference Δθ of the reference signals S1, S2 corresponding to the time difference between the generation time of the start signal M1 and the generation time of the stop signal M2 by $\Delta\theta = \theta stop - \theta start$ (9)

When the generation time difference Δt of both the pulse signals M1, M2 is shorter than the one cycle Ts of the reference signals S1, S2, the generation time difference Δt of both the pulse signals M1, M2 can be calculated on the basis of the above phase difference Δθ and the cycle Ts, by $\Delta t = (\Delta\theta/2\pi)Ts$ (10)

Here, the phase difference Δθ that the phase difference detection unit 42 calculates by the formula (9) takes a value within 0[rad] to 2π[rad]. Since the reference signals S1, S2 are a periodic signal, the calculated phase difference Δθ latently includes 2π+Δθ, 4π+Δθ, . . . , in addition to Δθ≦2π, and it can be expressed as the general formula: 2π(n−1)+Δθ (n: natural number).

On the other hand, as the generation time difference Δt of both the pulse signals M1, M2 to be calculated, the phase difference 2π(n−1)[rad] being the first term of the above general formula needs to be converted as well, and the natural number n is required to be specified.

Accordingly, even if the generation time difference Δt of both the pulse signals M1, M2 exceeds a time equivalent to one cycle (2π[rad]) of the reference signals S1, S2, the coarse time difference detection unit 43 detects the time difference Δt in brief with the resolution of about one cycle of the reference signals S1, S2.

Then, referring to the coarse time difference ta detected by the coarse time difference detection unit 43, the time difference calculation unit 44 selects the time difference Δt most approximate to the coarse time difference ta as the time difference to be determined, among the time differences Δt (Δθ/2π)Ts) by the formula (10) corresponding to the phase differences Δθ (={Δθ, 2π+Δθ, 4π+Δθ, . . . , 2π(n−1)+Δθ, . . . }) detected by the phase difference detection unit 42.

According to the above arithmetic operation, the time difference measuring device 40 of the surveying device 100 in this embodiment calculates the generation time difference Δt of the start signal M1 and the stop signal M2.

Then, the distance conversion unit 31 of the distance measuring means 30 calculates a distance D to the distance measuring object 90 on the basis of the time difference Δt measured by the time difference measuring device 40, by the following formula (11). Here, the constant c in the formula (11) represents the speed of light [m/sec].

$$D = c\Delta t/2 \tag{11}$$

The distance D to the distance measuring object 90 thus measured is outputted by the distance measurement result output unit 50, so that a user of the surveying device 100 can grasp the distance D.

Here, the distance measurement result output unit 50 is a display device or the like that displays the measured distance D to the distance measuring object 90 as numeric information, however it may display various setting information on the surveying device 100 and so forth, in addition to the distance D.

According to the time difference measuring device 40 and surveying device 100 in this embodiment, only one-time detection of each of the reference signals S1, S2 at the generation timings each of a pair of the start signal M1 and the stop signal M2 will accurately determine the generation time difference between both the signals M1, M2, thus leading to quickening the measurement of a time difference and distance.

By applying a sine wave signal and a cosine wave signal of which phase difference is π/2 to the reference signals S1, S2, calculating directly detected values (amplitudes) and calculating an arc tangent of a ratio of the amplitudes will produce a phase θ, and two phases thus obtained will give a phase difference Δθ.

The variations in time of the phase calculated by the arc tangent always become constant; therefore, regardless of the generation timings of the two pulse signals to the reference signals, a constant resolution and detection sensitivity can be acquired.

Figure 3:
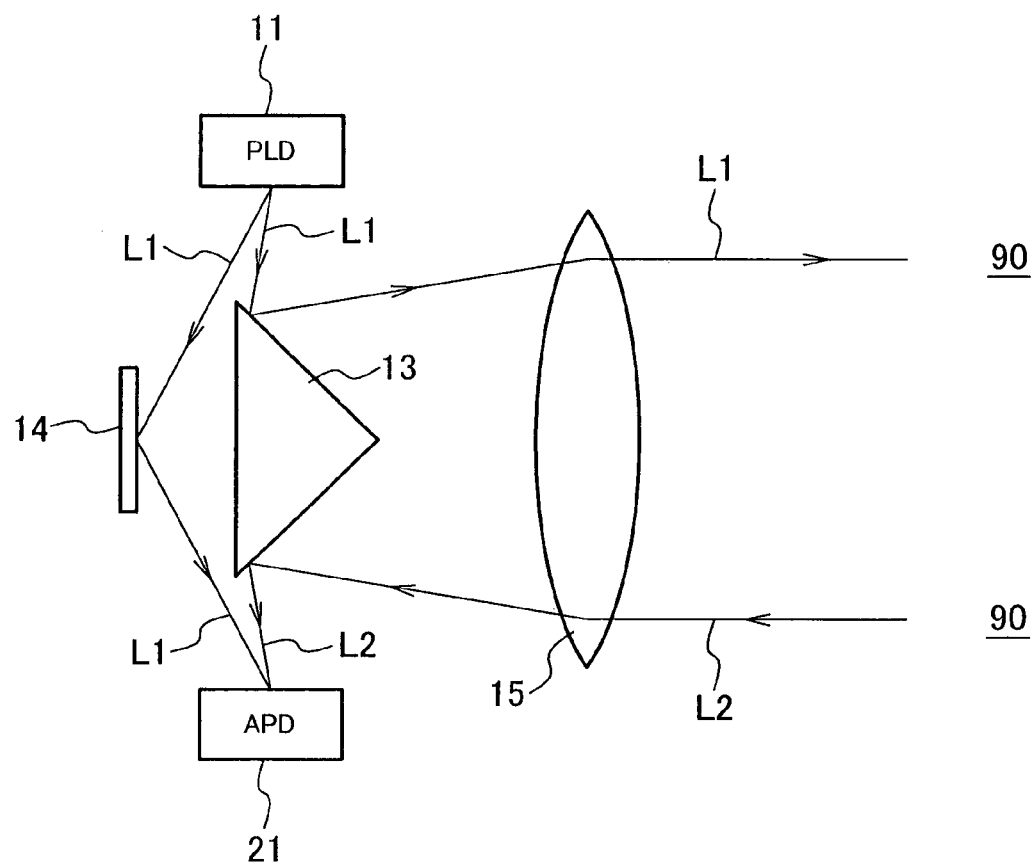
FIG. 3 is a chart illustrating a concrete optical system of the surveying device illustrated in FIG. 1.

Here, the construction illustrated in FIG. 3 can be applied to the measuring light emission means 10 and the reflected light detection means 20.

The optical system illustrated here assumes a construction wherein part of the functions of the emission optical system 12 and the detection optical system 22 are used for both, which includes a mirror 14 that reflects the laser beam L1 emitted from the PLD 11 and guides it to the photo-detection element (APD) 21, a prism 13 that guides the laser beam L1 to the distance measuring object 90 as well as guides the reflected laser beam L2 from the distance measuring object 90 to the photo-detection element 21, and a lens 15.

The construction illustrated here is only an example, and the time difference measuring device and the distance measuring device according to the invention are not limited to this construction.

Figure 4:
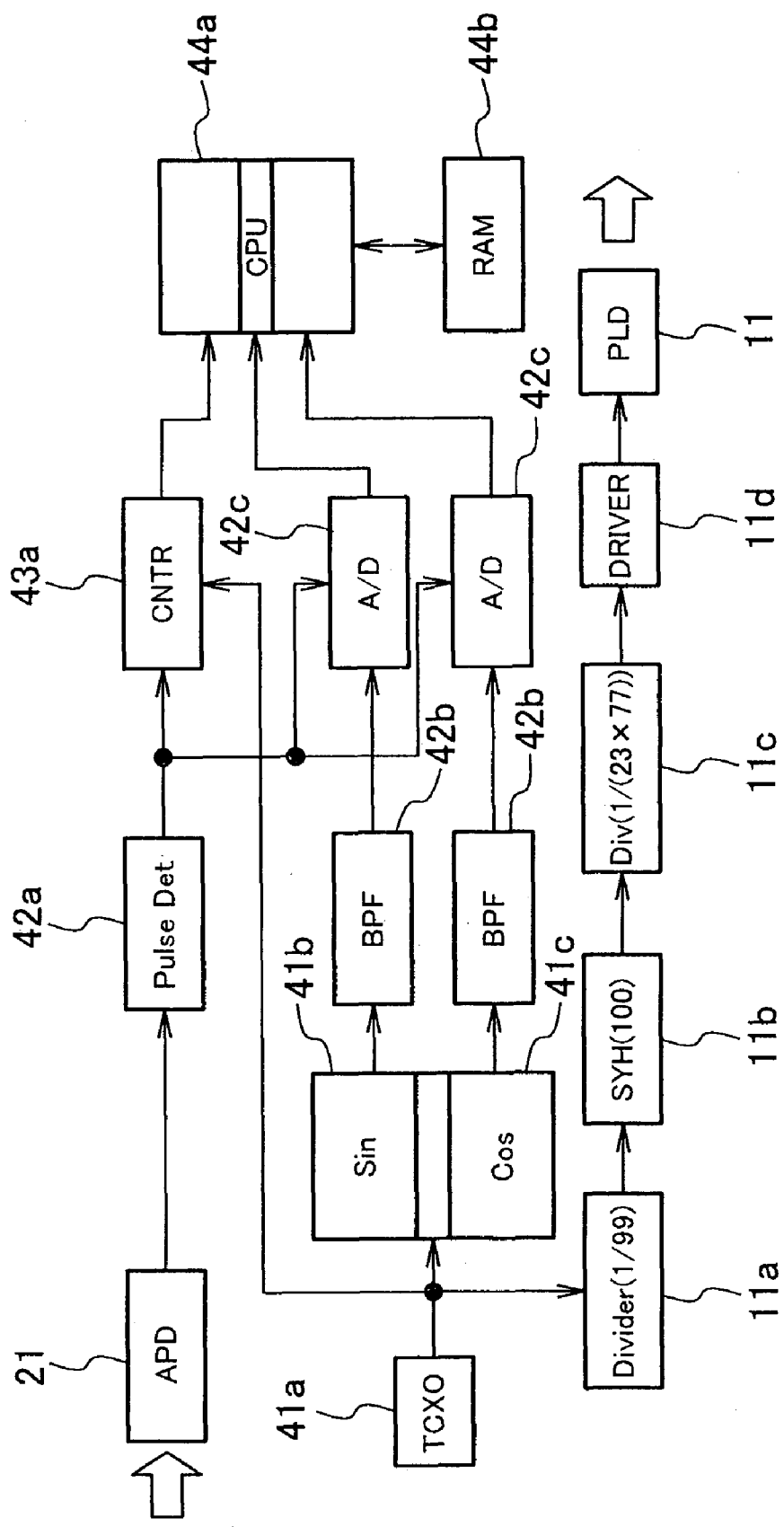
FIG. 4 is a chart illustrating a concrete control system (with synchronization) of the surveying device illustrated in FIG. 1.

Further, as an example, the construction illustrated in FIG. 4 can be applied to a concrete control system of the time difference measuring device 40.

In the control system illustrated, an oscillator (TXCO) 41a outputs a pulse signal of 15 MHz, based on which a sine wave generator (Sin) 41b and a cosine wave generator (Cos) 41c each generates a sine wave reference signal S1 and a cosine wave reference signal S2, of which phases are mutually shifted by π/2. The sine wave reference signal S1 and the cosine wave reference signal S2 pass bandwidth limitations by corresponding band-pass filters (BPF) 42b, 42b. The photo-detection element (APD) 21 detects the laser beam L1 and the reflected laser beam L2, based on which a pulse detector (Puls Det) 42a generates the start signal M1 and the stop signal M2. At the generation timings of the start signal M1 and the stop signal M2, A/D converters (A/D) 42c, 42c each samples and holds the reference signals S1, S2 subjected to the bandwidth limitations. The sampled/held values, that is, the amplitudes A11, A12, A21, and A22 are inputted to a CPU 44a.

On the other hand, the output pulse from the oscillator 41a is inputted to the pulse counter (CNTR) 43a. The pulse counter 43a counts the pulse number of the output pulse inputted between the two generation timings of the start signal M1 and the stop signal M2 generated by the pulse detector 42a. The counted result is inputted to the CPU 44a, which is provided for the calculation of the coarse time difference ta by the CPU 44a. A memory (RAM) 44b connected to the CPU 44a stores calculation results and various constants.

The time difference measuring device and the distance measuring device according to the invention is one that only one-time detection of each of the two pulse signals generated with a time difference accurately determines the time difference between these two pulse signals; however, in a practical measurement, it is preferable to measure plural times, to calculate the averages and standard deviations, etc. of the plural measurement results, and to enhance the reliability of measurement.

Now, the control system illustrated in FIG. 4 is constructed to output the start signal M1 plural times so that the output pulse from the oscillator 41a being a source of generating the reference signals S1, S2 synchronizes with the start signal M1 at each predetermined cycle of the output pulse (the phase difference thereof becomes zero).

Since the reference signal S1 (or reference signal S2) is synchronous with the output pulse from the oscillator 41a, the reference signal S1 and the start signal M1 are synchronized at each predetermined cycle of the reference signal S1 by this control system.

Here, in this control system, the $99^{th}$ cycle of the reference signal S1 and the $100^{th}$ cycle of the start signal M1 are set to become synchronous.

That is, a first frequency divider (Divider) 11a applies 1/99 frequency dividing to the output pulse from the oscillator 41a, and the frequency of the output pulse becomes 151.51 kHz. This frequency is multiplied by 100 by a synthesizer (SYH) 11b to become 15.151 MHz, thus the $100^{th}$ cycle becomes synchronous with the $99^{th}$ cycle of the output pulse of 15 MHz in the phase difference zero.

Further, a second frequency divider (Div) 11c applies 1/(23×77) frequency dividing to the signal of 15.151 MHz being the result of multiplication by the synthesizer 11b. This frequency-divided output pulse is inputted to a driver (DRIVER) 11d, and the driver 11d drives the PLD 11 to output the pulse laser beam L1.

Thus, the PLD 11 repeatedly emits the pulse laser beam L1 with the frequency of about 8.5 kHz. Along with the repeated emissions of the laser beam L1, the reflected laser beam L2 is repeatedly detected, which makes it possible to measure multiple times the time difference between the start signal M1 and the stop signal M2. Thus, the reliability of measurement can be enhanced through measurements by multiple times.

In the control system illustrated in FIG. 4, the reference signal S1 (or reference signal S2) and the start signal M1 are made up to be synchronous; however, these signals are not necessarily to be synchronous. Both the signals S1 (or S2), M1 may be not completely synchronous, that is, completely asynchronous, which depend on only the signals outputted individually from mutually independent two oscillators, and do not depend mutually, as illustrated in FIG. 5, for example.

Figure 5:
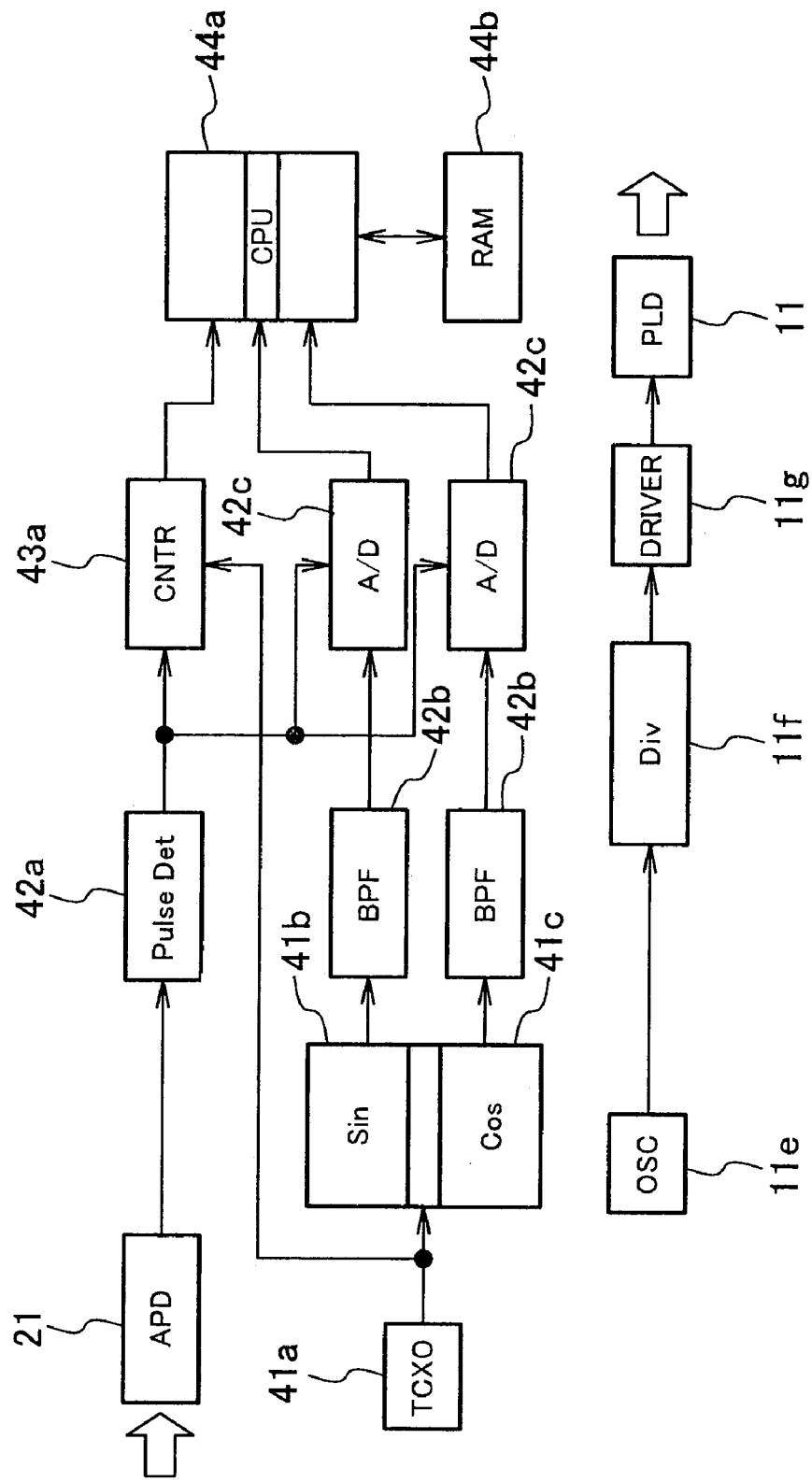
FIG. 5 is a chart illustrating a concrete control system (without synchronization) of the surveying device illustrated in FIG. 1.

In the control system illustrated in FIG. 5, the control system that generates the reference signals S1, S2 is completely independent from the control system that emits the laser beam L1 from the PLD 11. The control system that generates the reference signals S1, S2 is the same as the control system illustrated in FIG. 4. On the other hand, the control system that emits the laser beam L1 from the PLD 11 depends on an output pulse from an oscillator (OSC) 11e being completely independent from the oscillator 41a. A frequency divider (Div) 11f applies frequency dividing to the output pulse outputted from the oscillator 11e; based on the frequency-divided output pulse, a driver (DRIVER) 11g drives the PLD 11. Thus, the laser beam L1 is emitted from the PLD 11 at a totally independent timing from the generation timings of the reference signals S1, S2.

The time difference measuring device and the distance measuring device having the control system thus constructed are able to enhance the reliability of measurement by measuring plural times.

This embodiment applies a semiconductor laser to the light source of the surveying device in the above description; however, the surveying device according to the invention is not restricted to the mode of the light source. A light source that emits the other type of laser beam, a light source that emits light other than a laser beam, and a measuring wave emission source that generates a measuring wave such as a microwave other than light, etc. can be applied. When any of these is applied, the case exhibits the same function and effect as this embodiment.

Now, based on the amplitudes A11, A12 being the actually detected values can be calculated the phase θstart, and based on the amplitudes A21, A22 can be calculated the phase θstop. However, if the reference signals S1, S2 are generated in a condition that the maximum amplitudes A0 of both the reference signals S1, S2 are not completely identical, an error will be generated between the calculated phase start and a phase θstart', which is calculated by an actually measured value A0' of the maximum amplitude of the reference signal S1, the detected amplitude A11, an actually measured value A0'' of the maximum amplitude of the reference signal S2, and the detected amplitude A12. Thereby, the circle of the radius A0 as illustrated in FIG. 2(d) will be deformed into an ellipse. In the same manner, an error will be generated between the calculated phase θstop and a phase θstop', which is calculated by an actually measured value A0' of the maximum amplitude of the reference signal S1, the detected amplitude A21, an actually measured value A0'' of the maximum amplitude of the reference signal S2, and the detected amplitude A22; and the circle of the radius A0 is deformed into an ellipse.

Even when there occurs such an error, measuring plural times will shift the phase θstart and the phase θstop gradually at each time of the measurements to rotate the ellipse. This rotation displays a self-calibration function, which dissolves the error of measured values by the measurements plural times.

MODIFIED EXAMPLE

Figure 6:
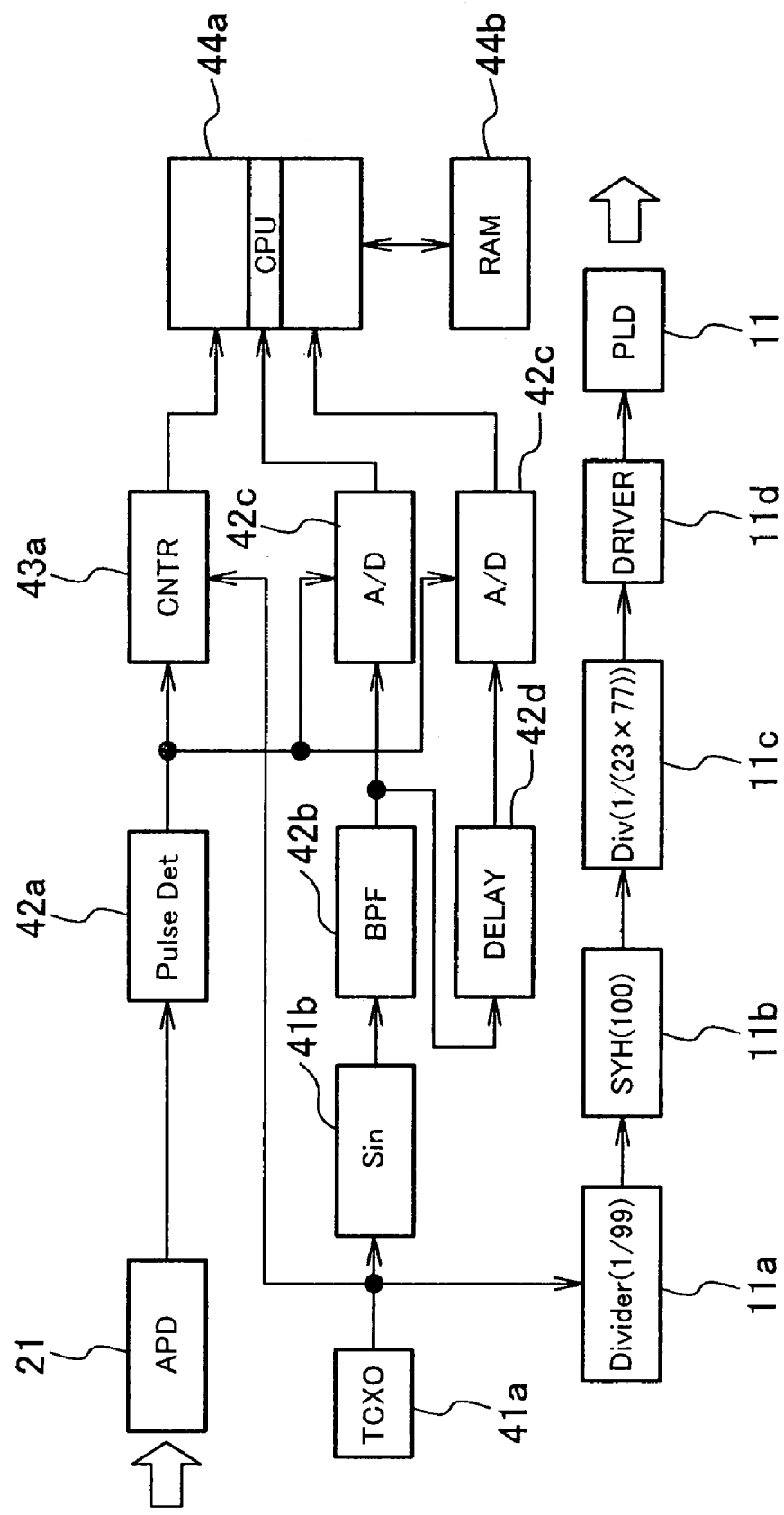
FIG. 6 is a chart illustrating a modified example of the control system of FIG. 4 wherein a reference signal generation unit generates only a sine wave signal as one reference signal, and the other reference signal is generated on the basis of the generated sine wave signal.

The aforementioned embodiment 1 is configured such that the reference signal generation unit 41 generates one reference signal S1 of a sine wave signal and the other reference signal S2 of a cosine wave signal each separately and outputs the reference signals S1, S2 each separately, as shown in FIG. 4. However, a configuration as illustrated in FIG. 6, for example, can be applied to a modified example, wherein the reference signal generation unit 41 is not provided with the cosine wave generator (Cos) 41c, and is provided with a delay circuit 42d that applies processing to delay the sine wave reference signal S1 generated by the sine wave generator (Sin) 41b, by a time equivalent to the phase difference 90 /2[rad] ($\pi/2$[rad]×(2n−1); n=1, 2, . . . ) of the reference signal S1.

Originally, the reference signal generation unit 41 generates only one reference signal (sine wave signal) S1, and the delay circuit 42d generates a new reference signal with the phase of the originally generated reference signal S1 delayed by $\pi/2$[rad].

The newly generated reference signal has the phase difference of $\pi/2$[rad] to the reference signal, that is, the sine wave signal, and this signal is a cosine wave signal.

Since the sine wave signal and the cosine wave signal are outputted, the modified example achieves substantially the same function and effect as those of the embodiment 1.

Of the two reference signals, one is original and the other is a generation based on the original in this manner, a difference of the signal waveforms such as a difference of the amplitudes between both the reference signals is hard to occur. Accordingly, the error in calculating the phases corresponding to the amplitudes can be restrained.

EMBODIMENT 2

Figure 7:
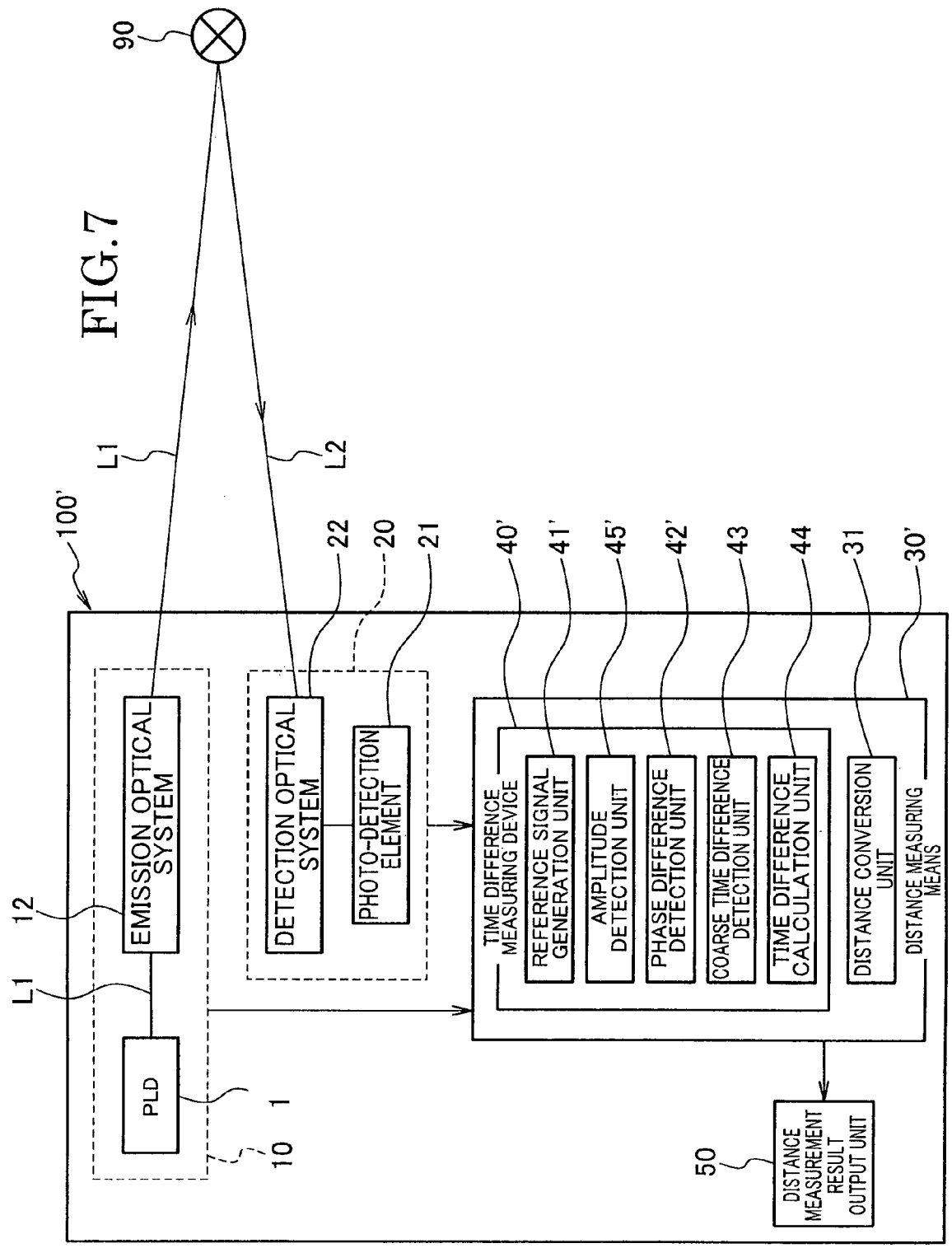
FIG. 7 is a block diagram illustrating a surveying device including the time difference measuring device according to another embodiment of the present invention.

FIG. 7 is a block diagram illustrating the construction of a surveying device 100' being one embodiment of a distance measuring device according to the invention, which includes a time difference measuring device of the invention as a part of a distance measuring means.

The surveying device 100' illustrated in FIG. 7 includes a measuring light emission means 10 (measuring wave emission means) that emits a pulse laser beam L1 as a measuring wave to a distance measuring object 90, a reflected light detection means 20 (reflected wave detection means) that detects a reflected laser beam L2 (reflected wave) acquired by the laser beam L1 reflecting on the distance measuring object 90, a distance measuring means 30', and a distance measurement result output unit 50. Here, the distance measuring means 30' outputs a pulse start signal M1 (first pulse signal) at a timing of the laser beam L1 being emitted from the measuring light emission means 10, outputs a pulse stop signal M2 (second pulse signal) at a timing of the reflected laser beam L2 being detected by the reflected light detection means 20, and calculates a distance to the distance measuring object 90 on the basis of a time difference Δt from the timing of the start signal M1 being outputted to the timing of the stop signal M2 being outputted. Then, the distance measurement result output unit 50 outputs the result of this distance measurement in a visible form.

The components except the distance measuring means 30' are the same as those to which the same symbols are given in the surveying device 100 of the embodiment 1 illustrated in FIG. 1; and the description thereof will be omitted.

The reflected light detection means 20 includes a photo-detection element 21 that detects the reflected laser beam L2, and a detection optical system 22 that guides the reflected laser beam L2 from the measuring distance object 90 to the photo-detection element 21. Here, the photo-detection element 21 may be any element that is capable of detecting the pulse reflected laser beam L2, for which can be used an avalanche photo-diode (APD), for example.

The distance measuring means 30' includes a time difference measuring device 40' that measures an output time difference Δt between the two pulse signals M1, M2 that are internally outputted at a detection timing of the laser beam L1 and a detection timing of the reflected laser beam L2, and a distance conversion unit 31 that converts the measured time difference Δt into the distance and outputs the result.

The time difference measuring device 40' internally generates the above two pulse signals M1, M2. Further, the time difference measuring device 40' includes a reference signal generation unit 41' (reference signal generation means) that generates a single reference signal S3, an amplitude detection unit 45', a phase difference detection unit 42' (phase difference detection means), a coarse time difference detection unit 43 (coarse time difference detection means) that detects a coarse time difference "ta" between the generation timings of the two pulse signals M1, M2 each, and a time difference calculation unit 44 (time difference calculation means). Here, the amplitude detection unit 45' that detects an amplitude A11' (amplitude of the reference signal S3 at a generation timing t1 of the start signal M1), A12' (amplitude of the reference signal S3 at a delay timing t1' of the start signal M1), A21' (amplitude of the reference signal S3 at a generation timing t2 of the stop signal M2), and A22' (amplitude of the reference signal S3 at a delay timing t2' of the stop signal M2), wherein the delay timing t1' is delayed by a time Δt1 equivalent to π/2[rad] of the phase of the reference signal S3 from the generation timing t1 of the start signal M1 (t1'=t1+Δt1), and the delay timing t2' is delay by a time Δt2 (=Δt1=Ts/4; Ts represents the cycle of the reference signal S3) from the generation timing t2 of the stop signal M2, (t2'=t2+Δt2). The phase difference detection unit 42' calculates a phase θstart and a phase θstop in the reference signal S3, corresponding to the generation timings t1, t2 of the two pulse signals M1, M2, and using these phases θstart, θstop, calculates a phase difference Δθ (=θstop−θstart) in the reference signal S3, corresponding to the time difference between the generation timings t1, t2 of the pulse signals M1, M2, on the basis of each pair (A11' and A12'), (A21' and A22') of the amplitudes A11', A21' at the generation timings t1, t2 and the amplitudes A12', A22' at the delay timings t1', t2' of each of the pulse signals M1, M2. And the time difference calculation unit 44 calculates a generation time difference Δt of the start signal M1 and the stop signal M2, on the basis of the phase difference Δθ detected by the phase difference detection unit 42', a cycle Ts of the reference signal S3, and the coarse time difference ta detected by the coarse time difference detection unit 43.

The reference signal S3 in this embodiment is a sine wave signal (A0 sin θ; A0 represents the maximum amplitude), for example, and it may be a cosine wave signal (A0 cos θ).

The delay times Δt1, Δt2 (=Ts/4) set by the amplitude detection unit 45' are equivalent to the phase difference of π/2[rad] in the reference signal S3, however they may be a time equivalent to the phase difference of the odd number-times of π/2[rad] (π/2[rad]×(2n−1); n=1, 2, . . . ) in the reference signal S3.

Next, the calculation principle of the generation time difference Δt between the start signal M1 and the stop signal M2 by the time difference measuring device 40' of the surveying device 100' in this embodiment will be described with reference to FIG. 8.

First, the reference signal generation unit 41' of the time difference measuring device 40' generates a sine wave signal S3 illustrated in FIG. 8(b).

Figure 8:
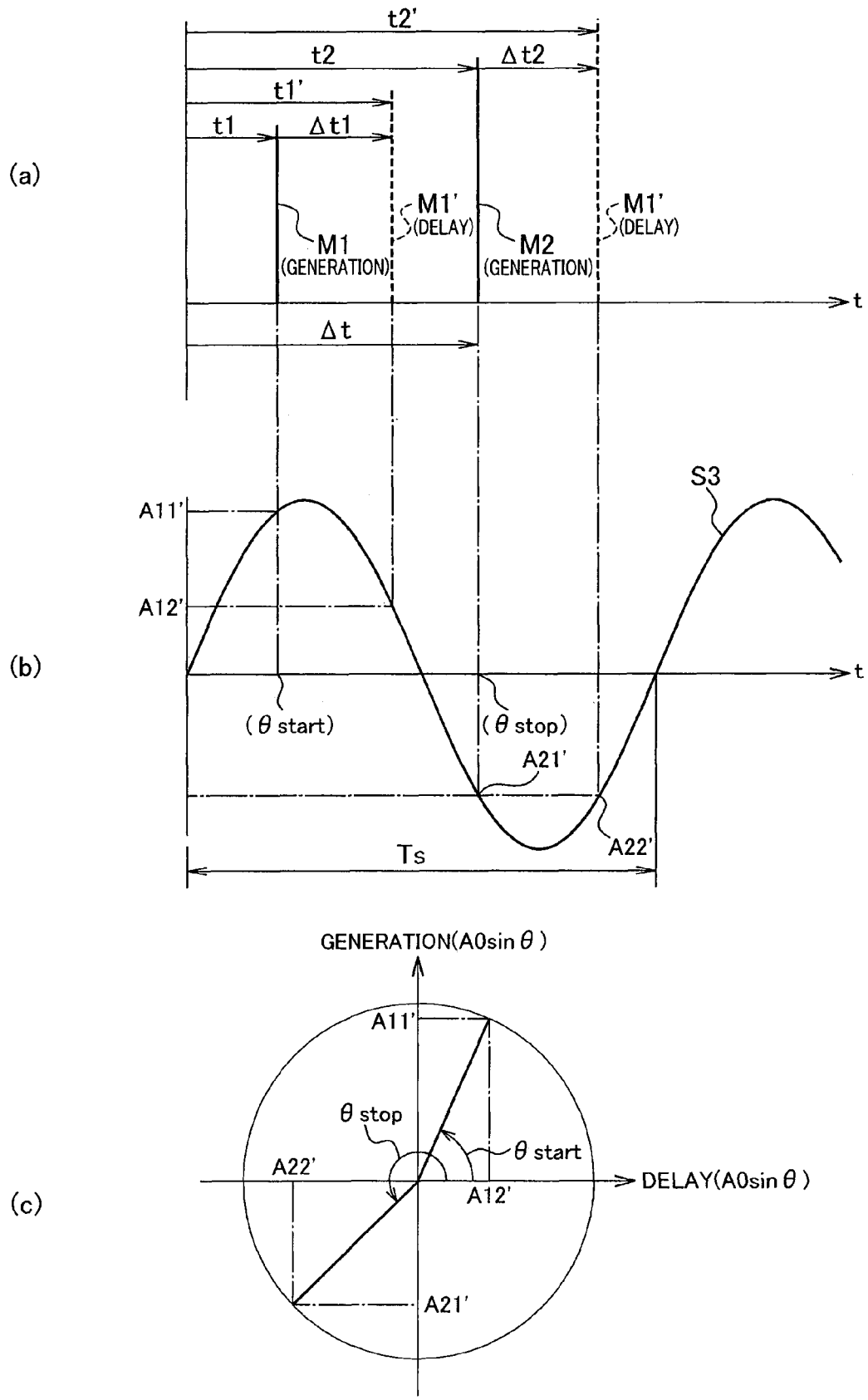
FIG. 8 is a chart explaining the principle of time difference measurement.

Next, the time difference measuring device 40' generates the start signal M1 illustrated in FIG. 8 (a) at an emission timing of the laser beam L1 from the PLD 11; the amplitude detection unit 45' samples/holds the reference signal S3 at the generation timing t1 of the start signal M1 and detects the amplitude A11' of the reference signal S3 at the generation timing t1.

Further, the amplitude detection unit 45' applies processing to delay the start signal M1 by the time Δt1 equivalent to the phase π/2[rad] of the reference signal S3 from the generation timing t1, generates a same pulse signal M1' as the start signal M1 at the delay timing t1' (=t1+Δt1), samples/holds the reference signal S3 by the pulse signal M1' generated at the delay timing t1', and detects the amplitude A12' of the reference signal S3 at the delay timing t1'.

Here, The amplitudes A11', A12' of the reference signal S3 acquired by sampling and holding can be expressed as follows, using the phase θstart from the generation time of the reference signal S3.

$$A11'=A0 \sin \theta\text{start} \qquad (1')$$

$$A12'=A0 \sin(\theta\text{start}+\pi/2) \qquad (2')$$

Here, θstart=2π(t1/Ts), using the cycle Ts of the reference signal S3.

Here, the formula (2') can be transformed into the following:

$$A12'=A0 \cos \theta\text{start} \qquad (2'')$$

The formulas (1') and (2'') show that taking the amplitude A11' at the generation timing t1 of the start signal M1 on the vertical axis and taking the amplitude A12' at the generation timing t1' of the start signal M1 on the horizontal axis will locate the intersection of both the amplitudes A11', A12' on the same circumference of a circle as FIG. 2(d), as illustrated in FIG. 8(c).

The ratio A11'/A12' of these amplitudes is given by $$A11'/A12'=\tan \theta\text{start} \qquad (3')$$

Therefore, the phase difference detection unit 42' calculates the phase θstart of the reference signal S3 at the generation time of the start signal M1, by $$\text{start}=\tan^{-1}(A11'/A12') \qquad (4')$$

The phase difference detection unit 42' temporarily stores this calculation result in a storage area not illustrated.

Further, the time difference measuring device 40' generates the stop signal M2 illustrated in FIG. 8(a) at a detection timing of the reflected laser beam L2 by the photo-detection element 21; and the amplitude detection unit 45' samples/holds the reference signal S3 at the generation timing t2 of the stop signal M2, and detects the amplitude A21' of the reference signal S3 at the generation timing t2.

Further, the amplitude detection unit 45' applies processing to delay the stop signal M2 by the time Δt2 equivalent to the phase π/2[rad] of the reference signal M3 from the generation timing t2, generates a same pulse signal M2' as the stop signal M2 at the delay timing t2' (=t2+Δt2), samples/holds the reference signal S3 by the pulse signal M2' generated at the delay timing t2', and detects the amplitude A22' of the reference signal S3 at the delay timing t2'.

Here, the amplitudes A21', A22' of the reference signal S3 acquired by sampling and holding can be expressed as follows, using the phase θstop from the generation time of the reference signal S3.

$$A21'=A0 \sin \theta stop \quad (5')$$

$$A22'=A0 \sin(\theta stop+\pi/2) \quad (6')$$

Here, θstop=2π(t2/Ts), using the cycle Ts of the reference signal S3.

Here, the formula (6') can be transformed into the following:

$$A22'=A0 \cos(\theta stop) \quad (6'')$$

The formulas (5') and (6'') show that taking the amplitude A21' at the generation timing t2 of the stop signal M2 on the vertical axis and taking the amplitude A22' at the generation timing t2' of the stop signal M2 on the horizontal axis will locate the intersection of both the amplitudes A21', A22' on the circumference of a circle, as illustrated in FIG. 8(c).

The ratio of these amplitudes A21'/A22' is given by $$A21'/A22'=\tan \theta stop \quad (7')$$

Therefore, the phase difference detection unit 42' calculates the phase θstop of the reference signal S3 at the generation time of the stop signal M2, by $$\theta stop=\tan^{-1}(A21'/A22') \quad (8')$$

The phase difference detection unit 42' temporarily stores this calculation result in a storage area not illustrated.

Then, the phase difference detection unit 42' reads out the two phases θstart, θstop stored in the storage area, and calculates the phase difference Δθ of the reference signal S3 corresponding to the time difference between the generation time of the start signal M1 and the generation time of the stop signal M2 by $$\Delta\theta=\theta stop-\theta start \quad (9)$$

When the generation time difference Δt of both the pulse signals M1, M2 is shorter than the one cycle Ts of the reference signal S3, the generation time difference Δt of both the pulse signals M1, M2 can be calculated on the basis of the above phase difference Δθ and the cycle Ts, by $$\Delta t=(\Delta\theta/2\pi)Ts \quad (10)$$

Here, the phase difference Δθ that the phase difference detection unit 42' calculates by the formula (9) takes a value within 0[rad] to 2π[rad]. Since the reference signal S3 is a periodic signal, the calculated phase difference Δθ latently includes 2π+Δθ, 4π+Δθ, . . . , in addition to 66 θ≦2π, and it can be expressed as the general formula: 2π(n−1)+Δθ (n: natural number).

On the other hand, as the generation time difference Δt of both the pulse signals M1, M2 to be calculated, the phase difference 2π(n−1)[rad] being the first term of the above general formula needs to be converted as well, and the natural number n is required to be specified.

Accordingly, even if the generation time difference Δt of both the pulse signals M1, M2 exceeds a time equivalent to one cycle (2π[rad]) of the reference signal S3, the coarse time difference detection unit 43 detects the time difference Δt in brief with the resolution of about one cycle of the reference signal S3.

Then, referring to the coarse time difference ta detected by the coarse time difference detection unit 43, the time difference calculation unit 44 selects the time difference Δt most approximate to the coarse time difference ta as the time difference to be determined, among the time differences Δt (=(Δθ/2π)Ts) by the formula (10) corresponding to the phase differences Δθ (={Δθ, 2π+Δθ, 4π+Δθ, . . . , 2π(n−1)+Δθ, . . . }) detected by the phase difference detection unit 42'.

According to the above arithmetic operation, the time difference measuring device 40' of the surveying device 100' in this embodiment calculates the generation time difference Δt of the start signal M1 and the stop signal M2.

Then, the distance conversion unit 31 of the distance measuring means 30' calculates a distance D to the distance measuring object 90 on the basis of the time difference Δt measured by the time difference measuring device 40', by the following formula (11). Here, the constant c in the formula (11) represents the speed of light [m/sec].

$$D=c\Delta t/2 \quad (11)$$

The distance D to the distance measuring object 90 thus measured is outputted by the distance measurement result output unit 50, so that a user of the surveying device 100' can grasp the distance D.

Here, the distance measurement result output unit 50 is a display device or the like that displays the measured distance D to the distance measuring object 90 as numeric information, however it may display various setting information on the surveying device 100' and so forth, in addition to the distance D.

According to the time difference measuring device 40' and surveying device 100' in this embodiment, only one-time detection of the amplitude of the reference signal S3 at each of the generation timings of a pair of the start signal M1 and the stop signal M2 and the delay timings thereof will accurately determine the generation time difference between both the signals M1, M2, thus leading to quickening the measurement of a time difference and distance.

By applying a sine wave signal (or cosine wave signal) to the reference signal S3, and applying the phase difference π/2[rad] (this phase difference may be the odd-number times of π/2[rad]) in the reference signal S3 to the delay times Δt1, Δt2 of the pulse signals M1, M2, calculating directly detected values (amplitudes) and calculating arc tangents of ratios of the amplitudes will produce the phases θ (θstart, θstop) corresponding to the reference signal S3 at the generation timing of the pulse signals M1, M2 and the two phases thus obtained will give a phase difference Δθ.

The variations in time of the phase calculated by the arc tangent always become constant; therefore, regardless of the generation timings of the two pulse signals to the reference signal, a constant resolution and detection sensitivity can be acquired.

Here, the construction illustrated in FIG. 3 can be applied to the measuring light emission means 10 and the reflected light detection means 20, in the same manner as the embodiment 1.

Figure 9:
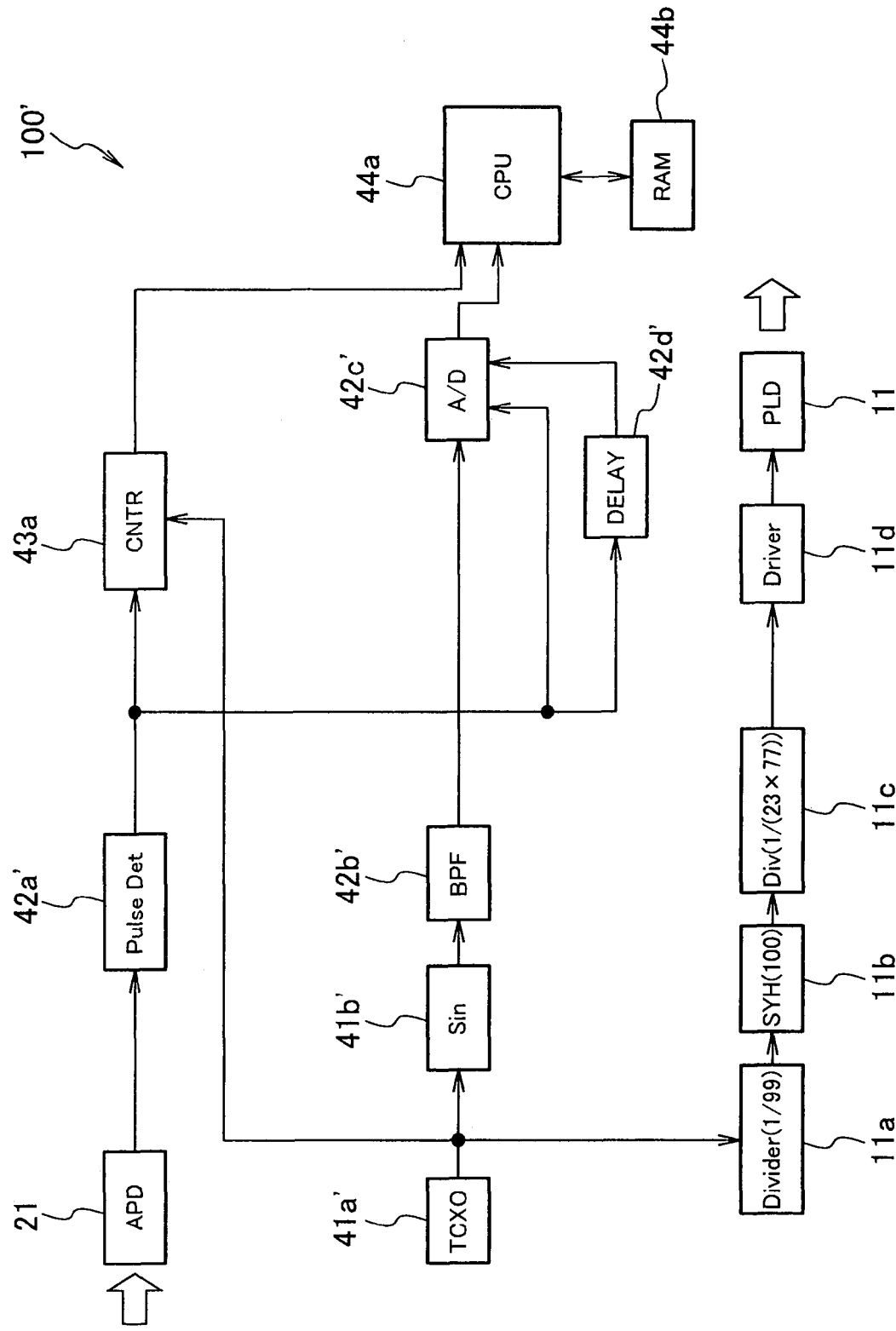
FIG. 9 is a chart illustrating a concrete control system (with synchronization) of the surveying device illustrated in FIG. 7.

Further, as an example, the construction illustrated in FIG. 9 can be applied to a concrete control system of the time difference measuring device 40'.

In the control system illustrated, an oscillator (TXCO) 41a' outputs a pulse signal of 15 MHz, based on which a sine wave generator (Sin) 41b' generates a sine wave reference signal S3. The sine wave reference signal S3 passes a bandwidth limitation by a band-pass filter (BPF) 42b'. The photo-detection element (APD) 21 detects the laser beam L1 and the reflected laser beam L2, based on which a pulse detector (Puls Det) 42a' generates the start signal M1 and the stop signal M2. At the generation timings of the start signal M1 and the stop signal M2 and at the delay timings of the start signal M1 and the stop signal M2 of which phases are delayed by π/2[rad] by the delay circuit 42d', an A/D converter (A/D) 42c' samples/holds the reference signal S3 subjected to the bandwidth limitation. The sampled/held values, that is, the amplitudes A11', A12', A21', and A22' are inputted to the CPU 44a.

On the other hand, the output pulse from the oscillator 41a' is inputted to the pulse counter (CNTR) 43a. The pulse counter 43a counts the pulse number of the output pulse inputted between the two generation timings of the start signal M1 and the stop signal M2 generated by a pulse detector 42a'. The counted result is inputted to the CPU 44a, which is provided for the calculation of the coarse time difference ta by the CPU 44a. The memory (RAM) 44b connected to the CPU 44a stores calculation results and various constants.

The time difference measuring device and the distance measuring device according to the invention is one that only one-time detection of the reference signal S3 at each of the generation timings t1, t2 and delay timings t1', t2' of the two pulse signals generated with a time difference (four times in total) accurately determines the time difference between these two pulse signals; however, in a practical measurement, it is preferable to measure plural times, to calculate the averages and standard deviations, etc. of the plural measurement results, and to enhance the reliability of measurement.

Now, the control system illustrated in FIG. 9 is constructed to output the start signal M1 plural times so that the output pulse from the oscillator 41a' being a source of generating the reference signal S3 synchronizes with the start signal M1 at each predetermined cycle of the output pulse (the phase difference thereof becomes zero).

Since the reference signal S3 is synchronous with the output pulse from the oscillator 41a', the reference signal S3 and the start signal M1 are synchronized at each predetermined cycle of the reference signal S3 by this control system.

Here in this control system, the $99^{th}$ cycle of the reference signal S3 and the $100^{th}$ cycle of the start signal M1 are set to become synchronous.

That is, a first frequency divider (Divider) 11a applies 1/99 frequency dividing to the output pulse outputted from the oscillator 41a', and the frequency of the output pulse becomes 151.51 kHz. This frequency is multiplied by 100 by a synthesizer (SYH) 11b to become 15.151 MHz, thus the $100^{th}$ cycle becomes synchronous with the $99^{th}$ cycle of the output pulse of 15 MHz in the phase difference zero.

Further, a second frequency divider (Div) 11c applies 1/(23×77) frequency dividing to the signal of 15.151 MHz being the result of multiplication by the synthesizer 11b. This frequency-divided output pulse is inputted to a driver (DRIVER) 11d, and the driver 11d drives the PLD 11 to output the pulse laser beam L1.

Thus, the PLD 11 repeatedly emits the pulse laser beam L1 with the frequency of about 8.5 kHz. Along with the repeated emissions of the laser beam L1, the reflected laser beam L2 is repeatedly detected, which makes it possible to measure multiple times the time difference between the start signal M1 and the stop signal M2. Thus, the reliability of measurement can be enhanced through measurements by multiple times.

In the control system illustrated in FIG. 9, the reference signal S3 and the start signal M1 are made up to be synchronous; however, these signals are not necessarily to be synchronous. Both the signal S3, M1 may be not completely synchronous, that is, completely asynchronous, which depend on only the signals outputted individually from mutually independent two oscillators, and do not depend mutually, as illustrated in FIG. 10, for example.

Figure 10:
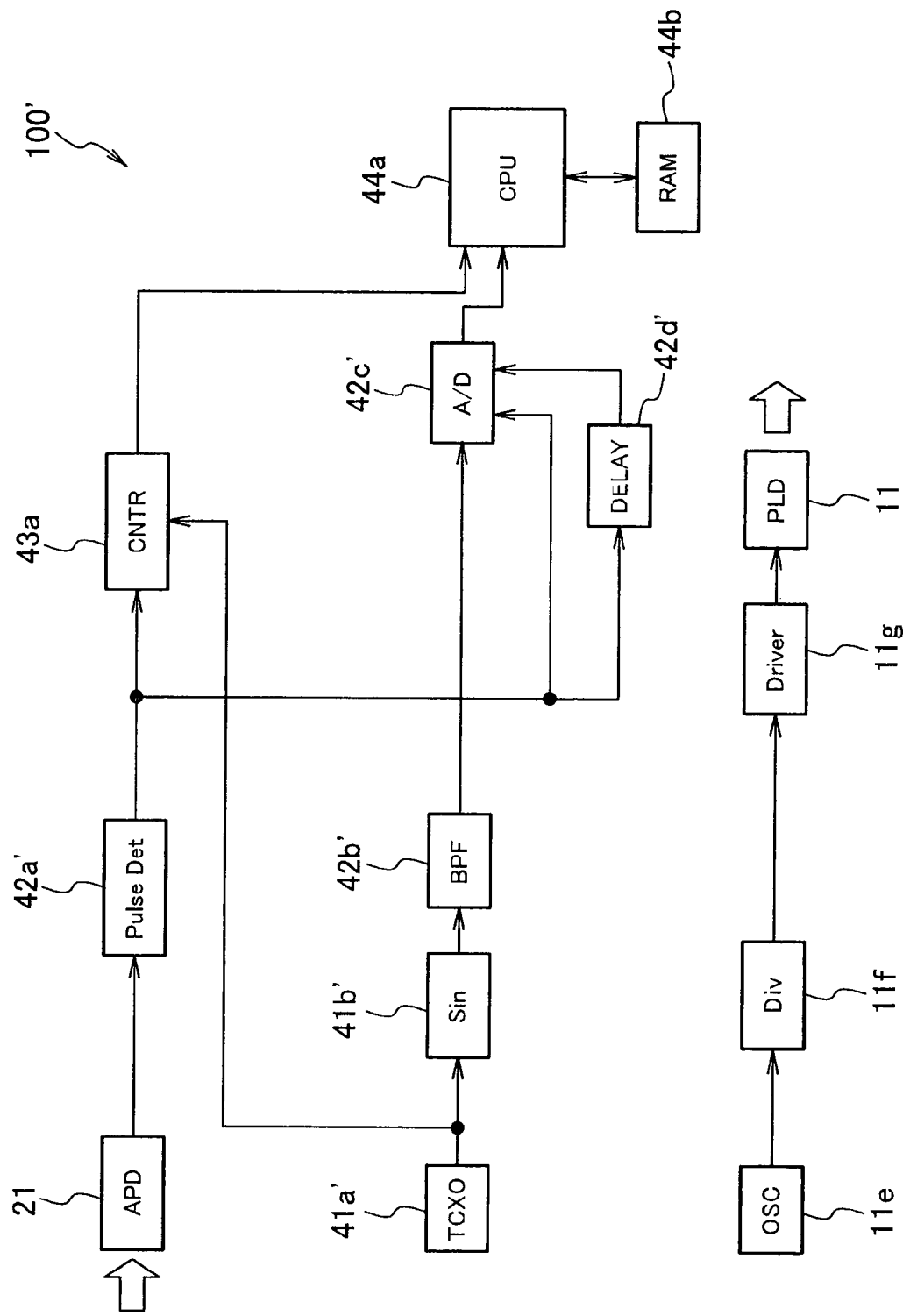
FIG. 10 is a chart illustrating a concrete control system (without synchronization) of the surveying device illustrated in FIG. 7.

In the control system illustrated in FIG. 10, the control system that generates the reference signal S3 is completely independent from the control system that emits the laser beam L1 from the PLD 11. The control system that generates the reference signal S3 is the same as the control system illustrated in FIG. 9. On the other hand, the control system that emits the laser beam L1 from the PLD 11 depends on an output pulse from the oscillator (OSC) 11e being completely independent from the oscillator 41a'. The frequency divider (Div) 11f applies frequency dividing to the output pulse outputted from the oscillator 11e; based on the frequency-divided output pulse, the driver (DRIVER) 11g drives the PLD 11. Thus, the laser beam L1 is emitted from the PLD 11 at a totally independent timing from the generation timing of the reference signal S3.

The time difference measuring device and the distance measuring device having the control system thus constructed are able to enhance the reliability of measurement by measuring plural times.

This embodiment applies a semiconductor laser to the light source of the surveying device in the above description; however, the surveying device according to the invention is not restricted to the mode of the light source. A light source that emits the other type of laser beam, a light source that emits light other than a laser beam, and a measuring wave emission source that generates a measuring wave such as a microwave other than light, etc. can be applied. When any of these is applied, the case exhibits the same function and effect as this embodiment.

Now, based on the amplitudes A11', A12' being the actually detected values can be calculated the phase θstart, and based on the amplitudes A21', A22' can be calculated the phase θstop. In the embodiment 1, since the reference signals S1, S2 are generated each separately, there can be a case wherein the maximum amplitudes A0 of both the reference signals S1, S2 are not completely identical, or both the reference signals S1, S2 are not completely synchronous when generated.

However, since the reference signal S3 is single in this embodiment, different from the embodiment 1, it is not necessary to consider the synchronization or identity between plural reference signals as the embodiment 1.

The embodiments have been described as illustrative examples; however this invention is not restricted to these. A person having ordinary skill in the art will understand that various improvements and modifications to the construction of this invention are possible without departing from the scope and spirit of the invention. From the view point of the above description, this invention intends to include the improvements and modifications thereof, and such improvements and modifications will be included within the scope of the claims and the equivalents.

The present application claims the priority on the basis of the Japanese Patent Application No. 2004-291495 filed on Oct. 4, 2004 and the Japanese Patent Application No. 2005-169500 filed on Jun. 9, 2005, and incorporates herein all the contents including the descriptions, drawings, and claims of those applications by reference.

INDUSTRIAL APPLICABILITY

The above embodiments described the surveying device as an example of the distance measuring device including the time difference measuring device of the present invention; however the invention is not restricted to this, and it is applicable to a technical field that measures a time difference between pulse signals with an extremely short time interval, or a technical field that demands a quick and high-precision distance measurement, such as a distance measuring device intending to include a natural object likely to be displaced by environmental influences such as a wind in a distance measuring object, and a figure measuring device that specifies the outline figure of a distance measuring object by measuring the distance to the distance measuring object and so forth.

The invention claimed is:

1. A time difference measuring device which measures a time difference of two or more pulse signals generated with a predetermined time difference, the time difference measuring device comprising:
   a reference signal generation unit configured to generate reference signals having a phase difference of approximately $\pi/2$;
   an amplitude detection unit configured to obtain two amplitudes based on the reference signals so as to be substantially equal to sampling the reference signals, at predetermined two timings which depend on generation timings of each of the pulse signals;
   a phase difference detection unit configured to calculate a phase difference of the generation timings of the pulse signals, on the basis of amplitudes of the two reference signals at each of the generation timings of the two pulse signals, detected by the amplitude detection unit, and on the basis of a ratio of amplitudes of the reference signals; and
   a time difference calculation unit configured to calculate a generation time difference of the pulse signals on the basis of the phase difference detected by the phase difference detection unit and a cycle of the reference signals.

2. A time difference measuring device according to claim 1, further comprising an approximate time difference detection unit configured to detect an approximate generation time difference between the generation timings of the two pulse signals,
   wherein the time difference calculation unit is configured to calculate, in addition to a precise time difference calculated on the basis of the phase difference detected by the phase difference detection unit and the cycle of the reference signals, the generation time difference of the two pulse signals with reference to the approximate generation time difference detected by the approximate time difference detection unit.

3. A time difference measuring device according to claim 1, wherein the one or more reference signals includes at least one of a sine wave signal and a cosine wave signal.

4. A time difference measuring device according to claim 3, wherein the phase difference detection unit is configured to:
   detect an amplitude A11 of the sine wave signal and an amplitude A12 of the cosine wave signal, at the generation timing or one pulse signal preceding in time series of the two or more pulse signals;
   calculate a ratio A11/A12 of the amplitudes A11, A12;
   calculate a phase $\theta$start on the basis of the amplitude ratio A11/A12 by $\tan^{-1}$(A11/A12);
   detect an amplitude A21 of the sine wave signal and an amplitude A22 of the cosine wave signal, at the generation timing of the other pulse signal succeeding in time series of the two or more pulse signals;
   calculate a ratio A21/A22 of the amplitudes A21, A22;
   calculate a phase $\theta$stop on the basis of the amplitude ratio A21/A22 by $\tan^{-1}$(A21/A22); and
   calculate a phase difference $\Delta\theta$ of the generation timings of the two or more pulse signals by ($\theta$stop-$\theta$start).

5. A time difference measuring device according to claim 1, wherein the reference signal generation unit is configured to originally generate one reference signal, generate a new reference signal of which phase is delayed by approximately $\pi/2$[rad] to the reference signal originally generated, and generate the originally generated reference signal and the new reference signal as the two reference signals having the phase difference of approximately $\pi/2$.

6. A distance measuring device, comprising:
   a measuring wave emission unit configured to emit a measuring wave to an object to be distance-measured;
   a reflected wave detection unit configured to detect a reflected wave acquired by the measuring wave reflected by the distance measuring object; and
   a distance measuring unit configured to acquire a first pulse signal at a timing of the measuring wave emitted from the measuring wave emission unit, acquire a second pulse signal at a timing of the reflected wave detected by the reflected wave detection unit, and obtain a distance to the distance measuring object on the basis of a time difference from the timing of the first pulse signal acquired to the timing of the second pulse signal acquired,
   wherein the distance measuring unit includes the time difference measuring device according to claim 1, and configured to obtain the distance to the distance measuring object on the basis of a time difference of the first pulse signal and the second pulse signal measured by the time difference measuring device.

7. A time difference measuring device which measures a time difference of two pulse signals generated with a predetermined time difference, the time difference measuring device comprising:
   a reference signal generation unit configured to generate at least two reference signals having a phase difference of approximately $\pi/2$;
   a phase difference detection unit configured to calculate a phase difference of generation timings of the two pulse signals, on the basis of amplitudes of the at least two reference signals at each of the generation timings of the two pulse signals; and
   a time difference calculation unit configured to calculate a generation time difference of the two pulse signals, on the basis of the phase difference detected by the phase difference detection unit and a cycle of the at least two reference signals.

8. A time difference measuring device according to claim 7, further comprising an approximate time difference detection unit configured to detect an approximate generation time difference between the generation timings of the two pulse signals,
   wherein the time difference calculation unit is configured to calculate, in addition to a precise time difference calculated on the basis of the phase difference detected by the phase difference detection unit and the cycle of the reference signals, the generation time difference of the two pulse signals with reference to the approximate generation time difference detected by the approximate time difference detection unit.

9. A time difference measuring device according to claim 7, wherein the at least two reference signals are a sine wave signal and a cosine wave signal.

10. A time difference measuring device according to claim 9, wherein the phase difference detection unit is configured to:
   detect an amplitude A11 of the sine wave signal and an amplitude A12 of the cosine wave signal, at the generation timing of one pulse signal preceding in time series of the two pulse signals;
   calculate a ratio A11/A12 of the amplitudes A11, A12;

calculate a phase θstart on the basis of the amplitude ratio A11/A12 by $\tan^{-1}(A11/A12)$;

detect an amplitude A21 of the sine wave signal and an amplitude A22 of the cosine wave signal, at the generation timing of the other pulse signal succeeding in time series of the two pulse signals;

calculate a ratio A21/A22 of the amplitudes A21, A22;

calculate a phase θstop on the basis of the amplitude ratio A21/A22 by $\tan^{-1}(A21/A22)$; and calculate a phase difference Δθ of the generation timings of the two pulse signals by (θstop-θstart).

11. A time difference measuring device according to claim 7, wherein the reference signal generation unit is configured to originally generate one reference signal, generate a new reference signal of which phase is delayed by approximately π/2[rad] to the reference signal originally generated, and generate the originally generated reference signal and the new reference signal as the two reference signals having the phase difference of approximately π/2.

12. A distance measuring device, comprising:
a measuring wave emission unit configured to emit a measuring wave to an object to be distance-measured;
a reflected wave detection unit configured to detect a reflected wave acquired by the measuring wave reflected by the distance measuring object; and
a distance measuring unit configured to acquire a first pulse signal at a timing of the measuring wave emitted from the measuring wave emission unit, acquire a second pulse signal at a timing of the reflected wave detected by the reflected wave detection unit, and obtain a distance to the distance measuring object on the basis of a time difference from the timing of the first pulse signal acquired to the timing of the second pulse signal acquired,
wherein the distance measuring unit includes the time difference measuring device according to any one of claim 1 to claim 5, and configured to obtain the distance to the distance measuring object on the basis of a time difference of the first pulse signal and the second pulse signal measured by the time difference measuring device.

13. A time difference measuring method which measures a time difference of two pulse signals generated with a predetermined time difference, the method comprising:
detecting an approximate generation time difference between the generation timings of the two pulse signals;
generating a sine wave signal and a cosine wave signal having the phase difference of approximately π/2 as two reference signals;
obtaining, on the basis of the amplitudes of the sine wave signal and the cosine wave signal at each of generation timings of the two pulse signals, a phase difference of the generation timings of the two pulse signals; and
calculating a generation time difference of the two pulse signals, on the basis of the obtained phase difference and a cycle of the reference signals and the approximate generation time difference.

14. A time difference measuring method according to claim 13, comprising:
detecting an amplitude A11 of the sine wave signal and an amplitude A12 of the cosine wave signal, at the generation timing of one pulse signal preceding in time series of the two pulse signals,
calculating a ratio A11/A12 of the amplitudes A11, A12,
calculating a phase θstart on the basis of the amplitude ratio A11/A12 by $\tan^{-1}(A11/A12)$,
detecting an amplitude A21 of the sine wave signal and an amplitude A22 of the cosine wave signal, at the generation timing of the other pulse signal succeeding in time series of the two pulse signals,
calculating a ratio A21/A22 of the amplitudes A21, A22,
calculating a phase θstop on the basis of the amplitude ratio A21/A22 by $\tan^{-1}(A21/A22)$, and
calculating a phase difference Δθ of the generation timings of the two pulse signals by (θstop-θstart).

15. A distance measuring method, comprising;
emitting a measuring wave to an object to be distance-measured;
acquiring a first pulse signal at a timing of the measuring wave emitted;
detecting a reflected wave acquired by the measuring wave reflected by the distance measuring object;
acquiring a second pulse signal at a timing of the reflected wave detected;
obtaining a distance to the distance measuring object on the basis of a time difference from the timing of the first pulse signal acquired to the timing of the second pulse signal acquired; and
obtaining the distance to the distance measuring object on the basis of the time difference between the first pulse signal and the second pulse signal acquired by the time difference measuring method according to claim 14.

16. A distance measuring method, comprising;
emitting a measuring wave to an object to be distance-measured;
acquiring a first pulse signal at a timing of the measuring wave emitted;
detecting a reflected wave acquired by the measuring wave reflected by the distance measuring object;
acquiring a second pulse signal at a timing of the reflected wave detected;
obtaining a distance to the distance measuring object on the basis of a time difference from the timing of the first pulse signal acquired to the timing of the second pulse signal acquired; and
obtaining the distance to the distance measuring object on the basis of the time difference between the first pulse signal and the second pulse signal acquired by the time difference measuring method according to claim 13.

17. A time difference measuring device which measures a time difference of two or more pulse signals generated with a predetermined time difference, the time difference measuring device comprising:
a reference signal generation unit configured to generate a single reference signal;
an amplitude detection unit configured to obtain amplitudes of the reference signal at generation timings of each of the pulse signals and predetermined delay timings corresponding to the generation timings;
a phase difference detection unit configured to calculate a phase difference between the generation timings of the pulse signals on the basis of each of the amplitudes of the reference signal at the generation timings and the delay timings obtained for each of the pulse signals, detected by the amplitude detection unit; and
a time difference calculation unit configured to calculate a generation time difference of the two or more pulse signals, on the basis of the phase difference detected by the phase difference detection unit and a cycle of the reference signal.

18. A time difference measuring device according to claim 17, wherein:
the reference signal generation unit is configured to generate a sine wave signal or a cosine wave signal as the reference signal; and the amplitude detection unit is configured to use the timings corresponding to the phase delays equivalent to the odd number-times of the phase difference of $\pi/2$ of the reference signal from the generation timing, as the delay timings.

19. A distance measuring device, comprising:
a measuring wave emission unit configured to emit a measuring wave to an object to be distance-measured;
a reflected wave detection unit configured to detect a reflected wave acquired by the measuring wave reflected by the distance measuring object; and
a distance measuring unit configured to acquire a first pulse signal at a timing of the measuring wave emitted from the measuring wave emission unit, acquire a second pulse signal at a timing of the reflected wave detected by the reflected wave detection unit, and obtain a distance to the distance measuring object on the basis of a time difference from the timing of the first pulse signal acquired to the timing of the second pulse signal acquired,
wherein the distance measuring unit includes the time difference measuring device according to claim 17, and configured to obtain the distance to the distance measuring object on the basis of a time difference of the first pulse signal and the second pulse signal measured by the time difference measuring device.

* * * * *